(12) United States Patent
Maki et al.

(10) Patent No.: US 12,244,530 B2
(45) Date of Patent: Mar. 4, 2025

(54) RECEIVING DEVICE, TRANSMITTING DEVICE, RECEIVING METHOD, AND TRANSMITTING METHOD

(71) Applicant: Panasonic Intellectual Property Corporation of America, Torrance, CA (US)

(72) Inventors: Shotaro Maki, Kanagawa (JP); Akihiko Nishio, Osaka (JP); Ayako Horiuchi, Kanagawa (JP); Ankit Bhamri, Hessen (DE); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 418 days.

(21) Appl. No.: 17/633,526

(22) PCT Filed: Aug. 5, 2020

(86) PCT No.: PCT/JP2020/030026
§ 371 (c)(1),
(2) Date: Feb. 7, 2022

(87) PCT Pub. No.: WO2021/029298
PCT Pub. Date: Feb. 18, 2021

(65) Prior Publication Data
US 2022/0303092 A1    Sep. 22, 2022

(30) Foreign Application Priority Data

Aug. 15, 2019   (JP) .................................. 2019-149144

(51) Int. Cl.
*H04W 72/044*  (2023.01)
*H04L 5/00*  (2006.01)

(52) U.S. Cl.
CPC ......... *H04L 5/0048* (2013.01); *H04W 72/044* (2013.01)

(58) Field of Classification Search
CPC . H04L 5/0048; H04L 27/2603; H04L 5/0007; H04L 27/2613; H04L 5/0051; H04W 72/044; H04W 72/23
See application file for complete search history.

(56) References Cited

U.S. PATENT DOCUMENTS

| 2015/0223211 | A1* | 8/2015 | Seo | ................... H04W 72/0446 370/329 |
| 2020/0403748 | A1 | 12/2020 | Yokomakura | |
| 2021/0058949 | A1* | 2/2021 | Kim | ...................... H04W 16/14 |

FOREIGN PATENT DOCUMENTS

| KR | 1020190040392 | * | 4/2019 | |
| WO | WO 2019049938 A1 | | 3/2019 | |
| WO | WO-2021188893 A1 | * | 9/2021 | ............... H04L 1/08 |

OTHER PUBLICATIONS

Ericsson, "Maintenance for RS and QCL", 3GPP TSG RAN WG#94bis Document R1-1811171 (Year: 2018).*

(Continued)

*Primary Examiner* — Joseph E Avellino
*Assistant Examiner* — Charles E Eckholdt
(74) *Attorney, Agent, or Firm* — Seed IP Law Group LLP

(57) ABSTRACT

In the present invention, a mobile station is provided with: a control circuit that, on the basis of information that can specify the disposition of a first reference signal in a first system, determines the disposition of a second reference signal in a second system; and a receiving circuit that receives the second reference signal on the basis of the determined disposition.

13 Claims, 16 Drawing Sheets

(56) References Cited

OTHER PUBLICATIONS

International Search Report for PCT/JP2020/030026 (Year: 2019).*
NTT Docomo, Inc., "Status Report to TSG", 3GPP TSG RAN Meeting #78 RP-172461 (Year: 2017).*
Ericsson, âMaintenance for RS and QCLâ, 3GPP TSG-RAN WG1 Meeting #94bis R1-1811171 (Year: 2018).*
Canadian Office Action, dated Nov. 10, 2023, for Canadian Patent Application No. 3,148,743. (4 pages).
Huawei, HiSilicon, "Consideration of NR signals and channels mapping around LTE CRS," R1-1700402, Agenda Item: 5.1.3.3, 3GPP TSG RAN WG1 NR Ad-Hoc Meeting, Spokane, USA, Jan. 16-20, 2017. (2 pages).
Extended European Search Report, dated Sep. 5, 2022, for European Application No. 20852102.1-1203. (9 pages).
Panasonic, "DMRS mapping for PDSCH mapping type B in DSS operation," R1-1908815, Agenda item: 7.2.14, 3GPP TSG RAN WG1 #98, Prague, CZ, Aug. 26-30, 2019. (4 pages).
International Search Report, mailed Oct. 27, 2020, for International Application No. PCT/JP2020/030026 (3 pages including translation).
RP-172461, NTT Docomo, Inc., New Radio (NR) Access Technology, 3GPP TSG RAN #78, 336 pages, Dec. 2017.
RP-181726, "Revised WID on New Radio Access Technology", NTT Docomo, 3GPP TSG RAN Meeting #81, 12 pages, Sep. 2018.
RP-191042, "Enhancements for dynamic spectrum sharing in Rel-16", Ericsson, 3GPP TSG-RAN Meeting #84, 8 pages, Jun. 2019.
RP-191599, "Enhancements for dynamic spectrum sharing in Rel-16", Ericsson, 3GPP TSG-RAN Meeting #84, 2 pages, Jun. 2019.
3GPP TS 38.211 V15.6.0, "NR; Physical channels and modulation (Release 15)," 97 pages, Jun. 2019.
3GPP TS 38.331 V15.6.0, "NR; Radio Resource Control (RRC) protocol specification (Release 15)," 519 pages, Jun. 2019.
3GPP TS 38.214 V15.6.0, "NR; Physical layer procedures for data (Release 15)," 105 pages, Jun. 2019.
R1-1811171, Ericsson, Maintenance for RS and QCL, 3GPP TSG-RAN WG1 #94bis, 9 pages, Oct. 2018.

* cited by examiner for PDSCH mapping type B:

- $l$ is defined relative to the start of the scheduled PDSCH resources
- $l_0 = 0$ PDSCH DM-RS positions $\bar{l}$ for single-symbol DM-RS.

| $l_d$ in symbols | DM-RS positions $\bar{l}$ | | | |
|---|---|---|---|---|
| | PDSCH mapping type B | | | |
| | dmrs-AdditionalPosition | | | |
| | 0 | 1 | 2 | 3 |
| 9 | $l_0$ | $l_0$, 6 | $l_0$, 3, 6 | $l_0$, 3, 6 |
| 10 | $l_0$ | $l_0$, 8 | $l_0$, 4, 8 | $l_0$, 3, 6, 9 |

PDSCH DM-RS positions $\bar{l}$ for double-symbol DM-RS.

| $l_d$ in symbols | DM-RS positions $\bar{l}$ | | | |
|---|---|---|---|---|
| | PDSCH mapping type B | | | |
| | dmrs-AdditionalPosition | | | |
| | 0 | 1 | 2 | 3 |
| 9 | $l_0$ | $l_0$, 5 | | |
| 10 | $l_0$ | $l_0$, 7 | | |

FIG. 2

| SYMBOL NUMBER (TOP OF SLOT OR THE LIKE IS 0) | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| NUMBER OF CRS PORTS: 1-2, MBSFN | 0 | | | | | | | | | | | | | |
| NUMBER OF CRS PORTS: 4, MBSFN | 0 | 1 | | | | | | | | | | | | |
| NUMBER OF CRS PORTS: 1-2, NON-MBSFN | 0 | | | | 4 | | | 7 | | | | 11 | | |
| NUMBER OF CRS PORTS: 4, NON-MBSFN | 0 | 1 | | | 4 | | | 7 | 8 | | | 11 | | |

FIG. 3

RECEIVING DEVICE, TRANSMITTING DEVICE, RECEIVING METHOD, AND TRANSMITTING METHOD

TECHNICAL FIELD

The present disclosure relates to a receiving apparatus, a transmitting apparatus, a receiving method, and a transmitting method.

BACKGROUND ART

A communication system referred to as 5th generation mobile communication system (5G) has been discussed. The 3rd Generation Partnership Project (3GPP) as an international standardizing body has been discussing upgrading of the 5G communication system in view of both of upgrading of LTE/LTE-Advanced systems and New Radio Access Technology (New RAT, also referred to as NR) which is a new scheme not necessarily backward compatible with the LTE/LTE-Advanced systems (for example, see Non-Patent Literature (hereinafter referred to as "NPL") 1).

In NR, technology in which the NR system and the LTE system simultaneously communicate while coexisting in the same frequency band (for example, Dynamic Spectrum Sharing (DSS)) has been discussed (for example, see NPL 2).

CITATION LIST

Non-Patent Literature

NPL 1
RP-181726, "Revised WID on New Radio Access Technology", NTT DOCOMO, September 2018
NPL 2
RP-191042, "Enhancements for dynamic spectrum sharing in Rel-16", Ericsson, June 2019
NPL 3
RP-191599, "Enhancements for dynamic spectrum sharing in Rel-16", Ericsson, June 2019
NPL 4
3GPP TS 38.211 V15.6.0, "NR; Physical channels and modulation (Release 15)", 2019-06
NPL 5
3GPP TS 38.331 V15.6.0, "NR; Radio Resource Control (RRC) protocol specification (Release 15)", 2019-06
NPL 6
3GPP TS 38.214 V15.6.0, "NR; Physical layer procedures for data (Release 15)", 2019-06

SUMMARY OF INVENTION

Technical Problem

However, a method of mapping a reference signal has not been sufficiently discussed.

One non-limiting and exemplary embodiment facilitates providing a receiving apparatus, a transmitting apparatus, a receiving method, and a transmitting method that are capable of appropriately mapping a reference signal.

A receiving apparatus according to an embodiment of the present disclosure includes: control circuitry, which, in operation, decides mapping of a second reference signal in a second system based on information that allows mapping of a first reference signal in a first system to be identified; and receiving circuitry, which, in operation, receives the second reference signal based on the decided mapping.

It should be noted that general or specific embodiments may be implemented as a system, a method, an integrated circuit, a computer program, a storage medium, or any selective combination thereof.

According to an embodiment of the present disclosure, a reference signal can be appropriately mapped.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 2 illustrates an example of PDSCH mapping type B;
FIG. 3 is a block diagram illustrating exemplary CRS mapping.

DESCRIPTION OF EMBODIMENTS

Hereinafter, embodiments of the present disclosure will be described in detail with reference to the accompanying drawings.

[Dynamic Spectrum Sharing (DSS)]

In DSS, the NR system and the LTE system can simultaneously communicate while coexisting in the same frequency band.

For example, in the operation of the DSS in Release 15 (hereinafter referred to as "Rel-15"), a channel for LTE may be mapped in an LTE downlink subframe in a frequency band (also referred to as "carrier") of LTE. For example, as illustrated in FIG. 1, a control signal for LTE and a reference signal (for example, a cell-specific reference signal (CRS)) for LTE may be mapped in 1 or more symbols (for example, orthogonal frequency division multiplexing (OFDM) symbols) from the top in an LTE downlink subframe, and a downlink data channel for LTE (for example, an LTE physical downlink shared channel (PDSCH)) and a CRS for LTE may be mapped in the remaining OFDM symbols.

Figure 1:
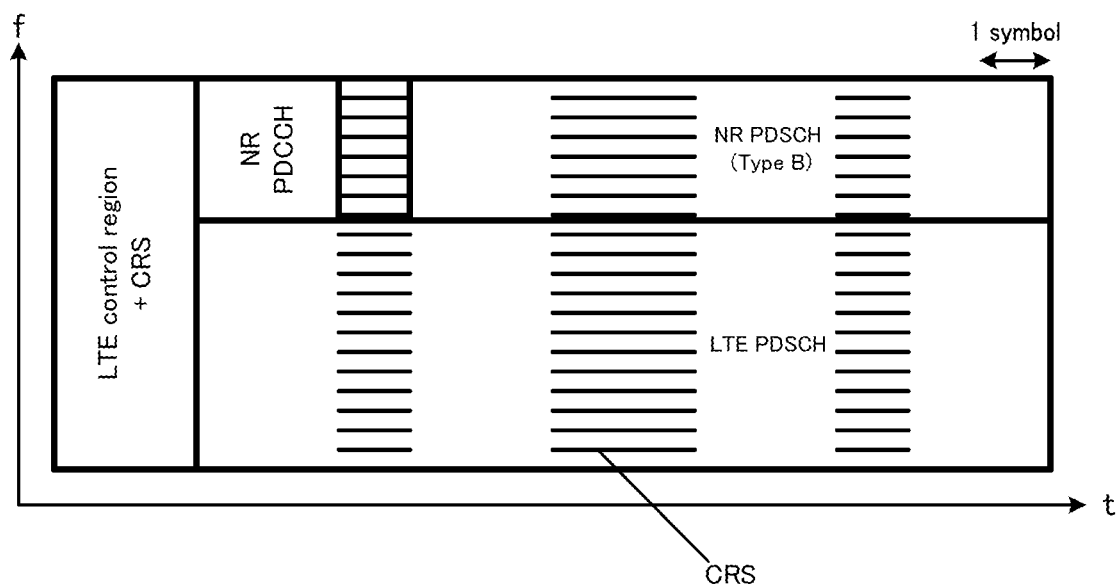
FIG. 1 illustrates an example of DSS.

In the DSS, for example, in an OFDM symbol period in which an LTE PDSCH is mapped, the LTE PDSCH may be mapped in a part of frequency bands and a downlink control channel for NR (NR physical downlink control channel (PDCCH)) or a downlink data channel for NR (NR PDSCH) may be mapped in another frequency band as illustrated in FIG. 1. In other words, the LTE PDSCH and each channel of NR may be frequency-divided. However, as illustrated in FIG. 1, a CRS (also referred to as "LTE CRS") can also be transmitted in, in addition to a frequency band in which the LTE PDSCH is mapped, a frequency band in which each channel of NR is mapped.

For example, the introduction of a PDSCH mapping method (referred to as "NR PDSCH mapping type B", for example) of length 9 and 10 OFDM symbols has been proposed for the DSS (for example, see NPL 3). For example, in this PDSCH mapping method, the position of a reference signal of NR (for example, a demodulation reference signal (DMRS)) is defined or can be configured so it does not collide with a symbol including an LTE CRS. The introduction of this NR PDSCH mapping type B enhances the operational efficiency of the DSS.

However, the PDSCH mapping as such is not defined in Rel-15 (for example, see NPL 4), and this DMRSs mapping in a PDSCH has not been sufficiently discussed.

Accordingly, in an embodiment of the present disclosure, a method of mapping a DMRS in a PDSCH will be described.

[DMRS Mapping]

As an example of a method of mapping a DMRS in an uplink data channel (for example, a physical uplink shared channel (PUSCH)), NPL 4 (for example, Section 6.4.1.1.3) defines a method of mapping a DMRS in NR PUSCH mapping type B of length 9 and 10 OFDM symbols.

For example, a mapping method similar to a method of mapping a DMRS in NR PUSCH mapping type B can be applied to a DMRS in the NR PDSCH mapping type B of length 9 and 10 OFDM symbols in a downlink data channel (for example, a PDSCH). For example, a method of mapping a DMRS in the NR PDSCH mapping type B of length 9 and 10 OFDM symbols may be as illustrated in FIG. 2. For example, the "dmrs-AdditionalPosition" illustrated in FIG. 2 is a higher-layer parameter (also referred to as "radio resource control (RRC) parameter", for example) indicating the position of a DMRS (in other words, an additional DMRS). For example, the dmrs-AdditionalPosition is indicated to (in other words, configured for) a mobile station (also referred to as "terminal" or "user equipment" (UE), for example) by a base station (also referred to as "gNB", for example).

Hereinafter, the method for mapping a DMRS illustrated in FIG. 2 is referred to as "Assumption 1". For example, in Assumption 1 illustrated in FIG. 2, in length $l_d=9$ or 10, a DMRS can be mapped in the top symbol (or the start symbol) "$l_0$" of a scheduled PDSCH in a slot and in a symbol(s) indicated by the "dmrs-AdditionalPosition" (for example, a position(s) relative to $l_0$ (=0)).

[NR DMRS Shift]

As described above, in the DSS, for example, an NR PDSCH may be transmitted in a frequency band in which an LTE CRS is transmitted. At this time, a DMRS in the NR PDSCH and an LTE CRS may be designed not to collide with each other in time resources and frequency resources (for example, see NPL 3).

For example, in a case where an LTE CRS can collide with a DMRS in an NR PDSCH, which is configured based on "Assumption 1", a base station can transmit the DMRS at a position different from the position (in other words, the resource position) of the DMRS configured based on "Assumption 1". Here, for example, processing of changing the position of a DMRS to a position different from a position configured based on "Assumption 1" may also be referred to as "DMRS shift".

[CRS Mapping]

In an LTE subframe, symbols (in other words, positions in a time domain) in which CRSs are mapped vary depending on the number of CRS ports or the type of the subframe, for example. Examples of the type of the subframe includes a multimedia broadcast service single frequency network (MBSFN) subframe and a non-MBSFN subframe. FIG. 3 illustrates an example of a method of mapping a CRS. For example, in an MBSFN subframe in which the number of CRS ports is 1 or 2, CRSs are transmitted in 4 symbols of the zeroth, fourth, seventh, and eleventh symbols. Further, for example, in an MBSFN subframe in which the number of CRS ports is 4, CRSs are transmitted in 6 symbols of the zeroth, first, fourth, seventh, eighth, and eleventh symbols. Further, for example, in a non-MBSFN subframe, CRSs are transmitted in 1 symbol of the zeroth symbol or in 2 symbols of the zeroth and first symbols.

Here, the first symbol in a subframe or a slot is "the zeroth symbol".

Further, positions of CRSs and the number of CRS ports in a frequency domain, and the timing of an MBSFN subframe can be configured for a mobile station by, for example, a higher-layer parameter (for example, a RRC parameter "RateMatchPatternLTE-CRS").

[Multi-User Multiple Input Multiple Output (MU-MIMO)]

Figure 4:
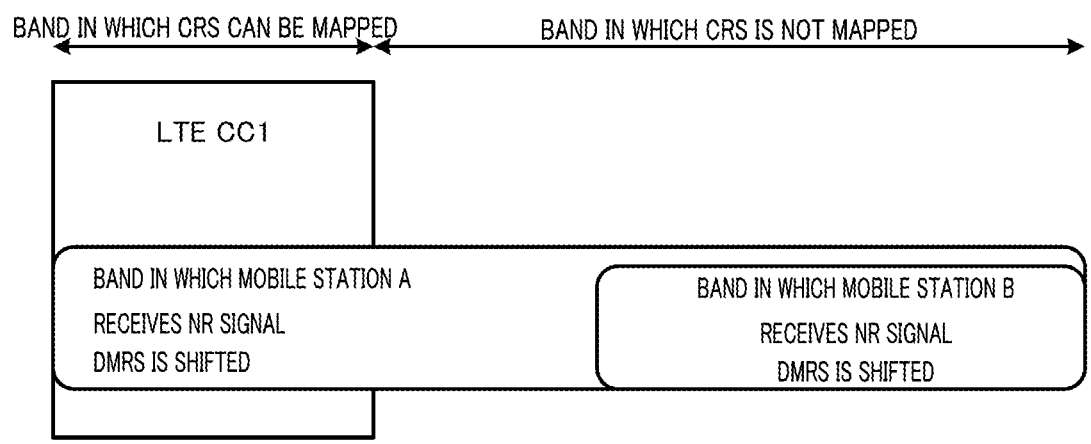
FIG. 4 illustrates an example of orthogonal DMRS based MU-MIMO and the DSS.

In MU-MIMO for a plurality of mobile stations, there is an operation in which NR DMRS ports between mobile stations are orthogonal to each other (referred to as "orthogonal DMRS based MU-MIMO", for example). In the case of the orthogonal DMRS based MU-MIMO, it is assumed as illustrated in FIG. 4, for example, that NR DMRS ports between mobile stations A and B are orthogonal to each other.

Here, for example, in a case where DSS operation is performed for mobile station A and is not performed for mobile station B, the DMRS shift can be performed for mobile station A and cannot be performed for mobile station B (not illustrated). At this time, since the positions of DMRSs differ between mobile stations A and B, the orthogonality between DMRS ports may deteriorate.

Note that, for example, in Rel-15, a mobile station is indicated by DCI related to antenna port mapping that "all the remaining orthogonal antenna ports are not associated with transmission of PDSCH to another UE" so that the mobile station is implicitly indicated that the orthogonal DMRS based MU-MIMO is operated (for example, see NPL 6).

Embodiment 1

[Overview of Communication System]

A communication system according to the present embodiment includes base station (corresponding to "transmitting apparatus") 100 and mobile station (corresponding to "receiving apparatus") 200.

In the present embodiment, a description will be given of a method in which base station 100 and mobile station 200 determine whether a symbol in which a DMRS is mapped is changed (in other words, shifted) to a symbol different from a configured symbol (for example, a symbol based on Assumption 1) in a slot (referred to as "NR slot", for example) for transmitting an NR signal (for example, a PDSCH) in the downlink, for example.

With his determination, base station 100 and mobile station 200 are capable of suppressing a collision between a DMRS and a CRS even in a case where the orthogonal DMRS based MU-MIMO is operated for mobile station 200, for example. Further, base station 100 and mobile station 200 are capable of suppressing deterioration of the DMRS orthogonality ports between mobile stations 200.

Figure 5:
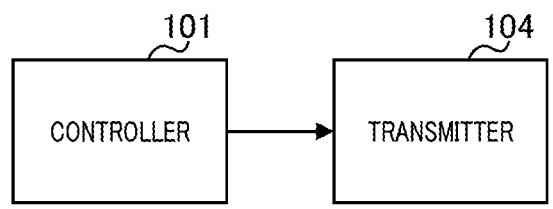
FIG. 5 is a block diagram illustrating a configuration example of a part of a base station.

FIG. 5 is a block diagram illustrating a configuration example of a part of base station 100 according to the present embodiment. In base station 100 illustrated in FIG. 5, controller 101 (for example, corresponding to control circuitry) decides mapping of a second reference signal (for example, a DMRS) in a second system (for example, the NR system) based on information that allows mapping of a first reference signal (for example, a CRS) in a first system (for example, the LTE system) to be identified, and transmitter 104 (for example, corresponding to transmitting circuitry) transmits the second reference signal with the decided mapping.

Figure 6:
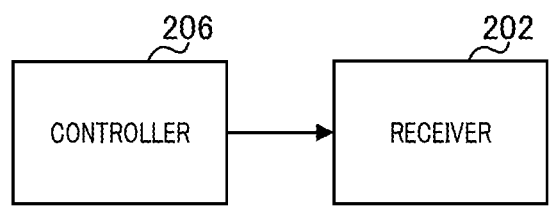
FIG. 6 is a block diagram illustrating a configuration example of a part of a mobile station.

FIG. 6 is a block diagram illustrating a configuration example of a part of mobile station 200 according to the present embodiment. In mobile station 200 illustrated in FIG. 6, controller 206 (for example, corresponding to control circuitry) decides mapping of a second reference signal (for example, a DMRS) in a second system (for example, the NR system) based on information that allows mapping of a first reference signal (for example, a CRS) in a first system (for example, the LTE system) to be identified, and receiver 202 (for example, corresponding to receiving circuitry) receives the second reference signal based on the decided mapping.

[Configuration of Base Station]

Figure 7:
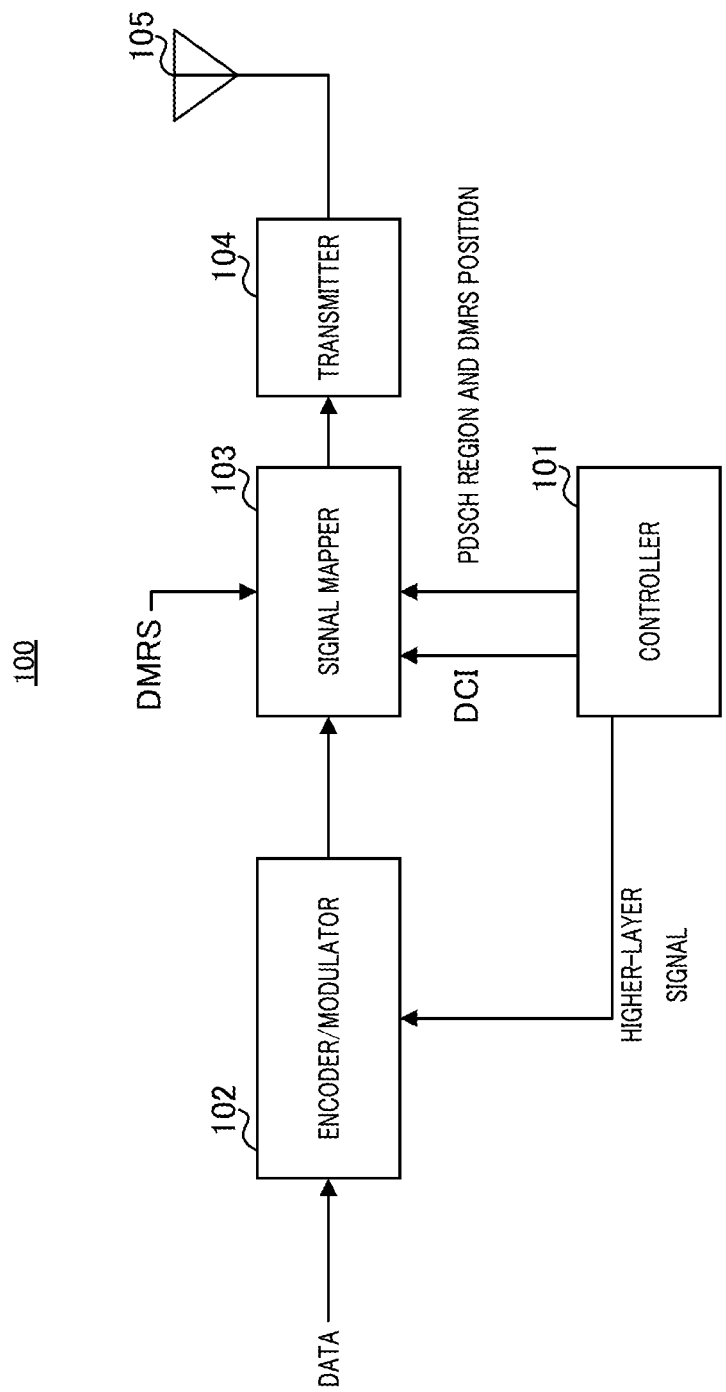
FIG. 7 is a block diagram illustrating a configuration example of the base station.

FIG. 7 is a block diagram illustrating a configuration example of base station 100 according to the present embodiment. In FIG. 7, base station 100 includes controller 101, encoder/modulator 102, signal mapper 103, transmitter 104, and antenna 105.

For example, controller 101 generates a higher-layer signal (for example, an RRC parameter) including a parameter configured for mobile station 200 and outputs the signal to encoder/modulator 102. The higher-layer signal may include, for example, information on an LTE CRS (for example, RateMatchPatternLTE-CRS) or information on a band configured for mobile station 200 (for example, an active BWP: bandwidth part).

Further, controller 101 decides information on data (for example, a PDSCH). For example, controller 101 decides an active BWP to which a PDSCH is transmitted, an assignment region of a PDSCH (referred to as "PDSCH region", for example), or whether the orthogonal DMRS port based MU-MIMO is operated. Controller 101 then outputs to signal mapper 103 downlink control information (for example, downlink control information (DCI)) including information that explicitly or implicitly indicates the decided information. Further, controller 101 outputs (in other words, instructs) the decided PDSCH region to signal mapper 103.

Further, controller 101 determines whether the position of a DMRS in a PDSCH (for example, the position of a symbol) is changed (in other words, shifted) from a reference position (for example, a position associated with a PDSCH region; for example, a position in Assumption 1 illustrated in FIG. 2). Controller 101 outputs information on the determined position of the DMRS to signal mapper 103.

Encoder/modulator 102 performs error correction coding and modulation of data (for example, a PDSCH) and a higher-layer signal inputted from controller 101, and outputs the modulated signal to signal mapper 103.

Signal mapper 103 maps (in other words, assigns or maps) DCI inputted from controller 101 in a resource of a PDCCH region, for example. Further, signal mapper 103 maps a DMRS and a signal inputted from encoder/modulator 102 in resources of a PDSCH region. Signal mapper 103 outputs the signals mapped in the resources to transmitter 104.

Transmitter 104 performs radio transmission processing including frequency conversion using a carrier wave on a signal inputted from signal mapper 103, and outputs the signal subjected to the radio transmission processing to antenna 105.

Antenna 105 radiates a signal (in other words, a downlink signal) inputted from transmitter 104 toward mobile station 200.

[Configuration of Mobile Station]

Figure 8:
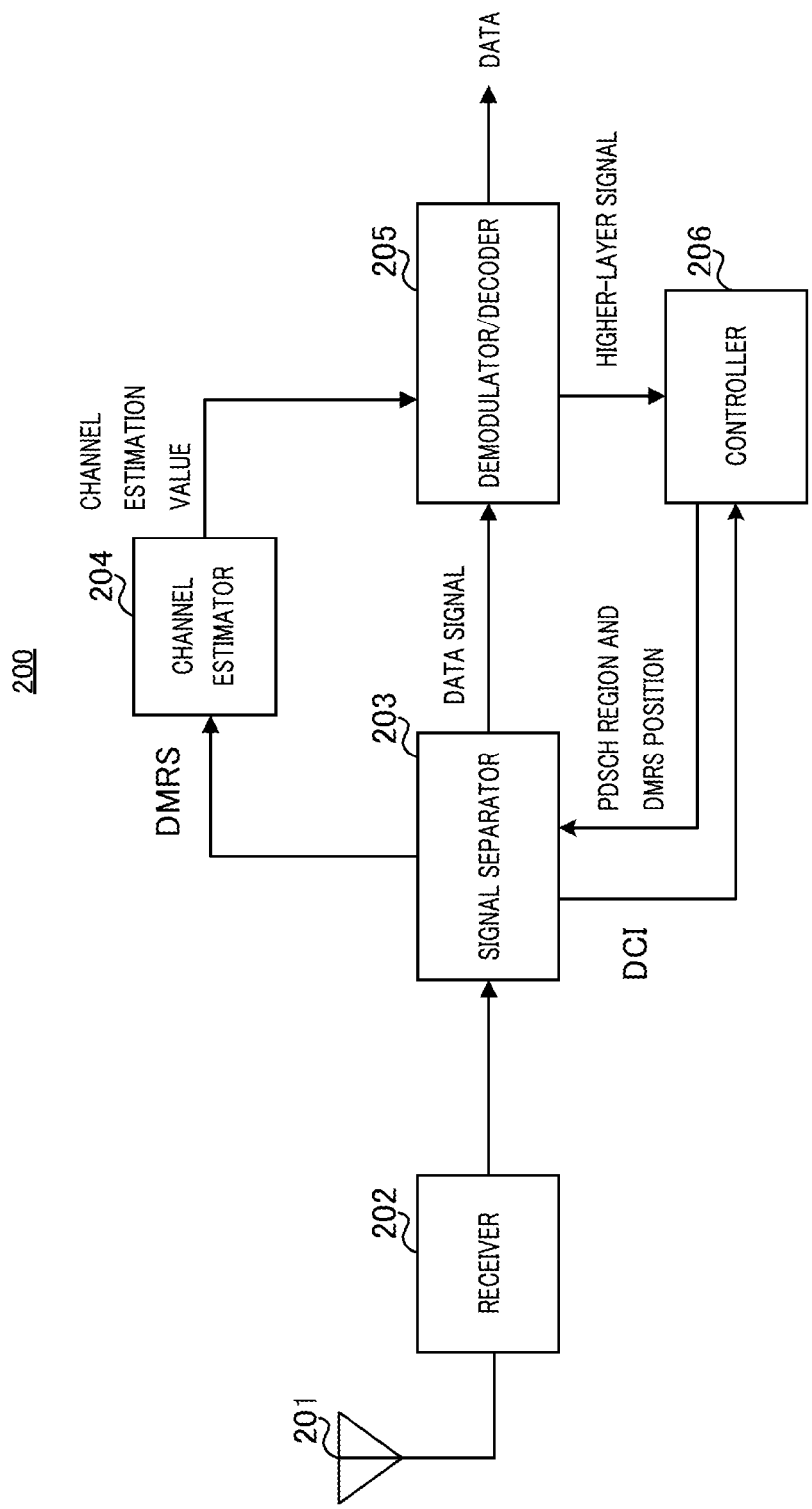
FIG. 8 is a block diagram illustrating a configuration example of the mobile station.

FIG. 8 is a block diagram illustrating a configuration example of mobile station 200 according to the present embodiment. In FIG. 8, mobile station 200 includes antenna 201, receiver 202, signal separator 203, channel estimator 204, demodulator/decoder 205, and controller 206.

Antenna 201 receives a downlink signal transmitted by base station 100 (for example, see FIG. 7) and outputs the signal to receiver 202.

Receiver 202 performs radio reception processing including frequency conversion on a signal inputted from antenna 201, and outputs the signal subjected to the radio reception processing to signal separator 203.

Signal separator 203 extracts (in other words, separates), for example, DCI mapped in a resource of a PDCCH region from a signal inputted from receiver 202, and outputs the DCI to controller 206. Further, signal separator 203 extracts (in other words, separates) a data signal and a DMRS mapped in resources of a PDSCH region based on information indicating the resources of the PDSCH region and information indicating the position of the DMRS, which are inputted from controller 206. Signal separator 203 outputs the data signal to demodulator/decoder 205 and outputs the DMRS to channel estimator 204.

Channel estimator 204 performs channel estimation (for example, calculation of a channel estimation value) based on a DMRS inputted from signal separator 203. Channel estimator 204 outputs information indicating the channel estimation value to demodulator/decoder 205.

Demodulator/decoder 205 demodulates and decodes a data signal inputted from signal separator 203 based on a channel estimation value inputted from channel estimator 204. Demodulator/decoder 205 outputs a higher-layer signal obtained by the decoding to controller 206.

Controller 206 identifies, for example, a PDSCH region and the position of a DMRS associated with the PDSCH region based on a higher-layer signal inputted from demodulator/decoder 205 and DCI inputted from signal separator 203.

Further, controller 206 determines whether the position of a DMRS in a PDSCH (for example, the position of a symbol) is changed (in other words, shifted) from a reference position (for example, a position in Assumption 1 illustrated in FIG. 2).

Controller 206 outputs information on a PDSCH region and information on the position of a DMRS to signal separator 203.

[Operation Example of Base Station 100 and Mobile Station 200]

Next, an operation example of base station 100 (see FIG. 7) and mobile station 200 (see FIG. 8) will be described.

Figure 9:
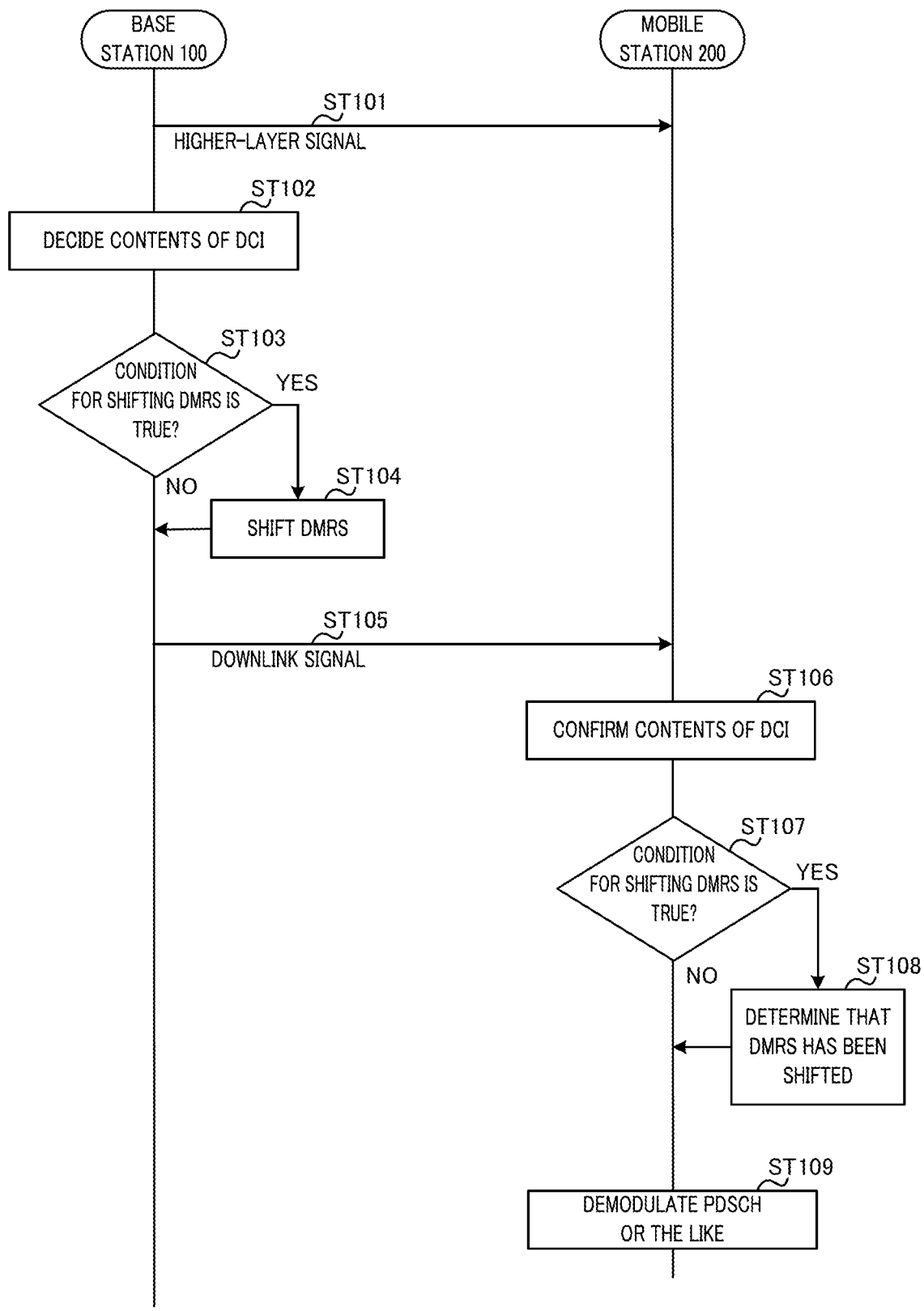
FIG. 9 is a flowchart illustrating an operation example of the base station and the mobile station.

FIG. 9 is a flowchart illustrating an example of processing of base station 100 and mobile station 200.

For example, base station 100 indicates mobile station 200 of a higher-layer signal (in other words, configures a higher-layer signal for mobile station 200) (ST101). Mobile station 200 receives the uplink-layer signal indicated by base station 100.

The higher-layer signal may include, for example, information on an LTE CRS (for example, RateMatchPatternLTE-CRS) or information on a band assigned to mobile station 200 (for example, an active BWP). Further, for example, the information on an active BWP may include information on sub carrier spacing (SCS) configured for mobile station 200. Note that, mobile station 200 may be indicated of these pieces of information by at least one of a higher-layer parameter and downlink control information (for example, DCI) or these pieces of information may be configured for mobile station 200 in advance.

Base station 100 decides contents of the DCI of which mobile station 200 is indicated (ST102). The DCI may include, for example, the following information.

<PDSCH Assignment Information>

PDSCH assignment information may include, for example, information on a resource of a frequency domain to which a PDSCH (for example, mapping type B) is assigned, and information such as a resource of a time domain in which a PDSCH is mapped (for example, a start symbol and a symbol length).

<PDSCH Transmission Band Information>

PDSCH transmission band information may include, for example, information on a BWP to which a PDSCH is transmitted (for example, including information on sub carrier spacing).

<Information on Orthogonal DMRS Port Based MU-MIMO>

Information on the orthogonal DMRS port based MU-MIMO may include, for example, information indicating whether the orthogonal DMRS port based MU-MIMO is operated for mobile station 200. For example, base station 100 may explicitly or implicitly indicate mobile station 200 of the information on the orthogonal DMRS port based MU-MIMO.

Note that, information included in the DCI is not limited to the information described above, and may be other information.

Base station 100 determines whether the position of a DMRS in a PDSCH is configured for (in other words, is changed or shifted to) a position different from a configured position (for example, a position in "Assumption 1" illustrated in FIG. 2), based on information configured for mobile station 200 (for example, information included in a higher-layer parameter and the DCI) (ST103). For example, base station 100 may determine whether a condition for shifting a DMRS is "true" or "false".

In a case where base station 100 has determined that the DMRS is shifted (ST103: YES), base station 100 decides that the position of the DMRS is the n-th symbol different from the m-th symbol configured for mobile station 200, for example (ST104). In other words, the position of the DMRS configured for mobile station 200 is shifted from the m-th symbol through the n-th symbol.

In a case where base station 100 has determined that the DMRS is not shifted (ST103: NO), on the other hand, base station 100 does not change (does not shift) the position of the DMRS.

Base station 100 transmits a downlink signal to mobile station 200 (ST105). The downlink signal may include, for example, at least one of the PDSCH including the DMRS, and a PDCCH including the DCI. Note that, the DMRS is mapped at a position (for example, a symbol) decided by base station 100, for example.

For example, mobile station 200 receives the downlink signal transmitted from base station 100 and confirms information (in other words, contents) indicated by the DCI in the PDCCH included in the downlink signal (ST106). For example, mobile station 200 may determine based on assignment information on the PDSCH that the position of the DMRS is configured for the m-th symbol.

For example, mobile station 200 determines based on the received higher-layer signal and information indicated by the DCI whether the position of the DMRS in the PDSCH has been configured for (in other words, changed or shifted to) the position (for example, the n-th symbol) different from the configured position (for example, the m-th symbol) (ST107). For example, mobile station 200 may determine whether the condition for shifting the DMRS is "true" or "false".

Ina case where base station 100 has determined that the DMRS is shifted (ST107: YES), mobile station 200 decides that the position of the DMRS is the n-th symbol different from the m-th symbol configured for mobile station 200, for example (ST108). In other words, the position of the DMRS configured for mobile station 200 is shifted from the m-th symbol through the n-th symbol.

In a case where base station 100 has determined that the DMRS is not shifted (ST107: NO), on the other hand, mobile station 200 does not change (does not shift) the position of the DMRS.

Mobile station 200 performs reception processing of the PDSCH (for example, demodulation processing) based on the DMRS mapped at the determined position, for example (ST109).

Next, operation examples of DMRS mapping according to the present embodiment will be described, respectively.

Operation Example 1-1

In Operation Example 1-1, for example, a method will be described in which base station 100 and mobile station 200 determine whether the position of a DMRS configured for the eleventh symbol (for example, m=11) in the NR slot is changed (in other words, shifted) to the twelfth symbol (n=12).

Figure 10:
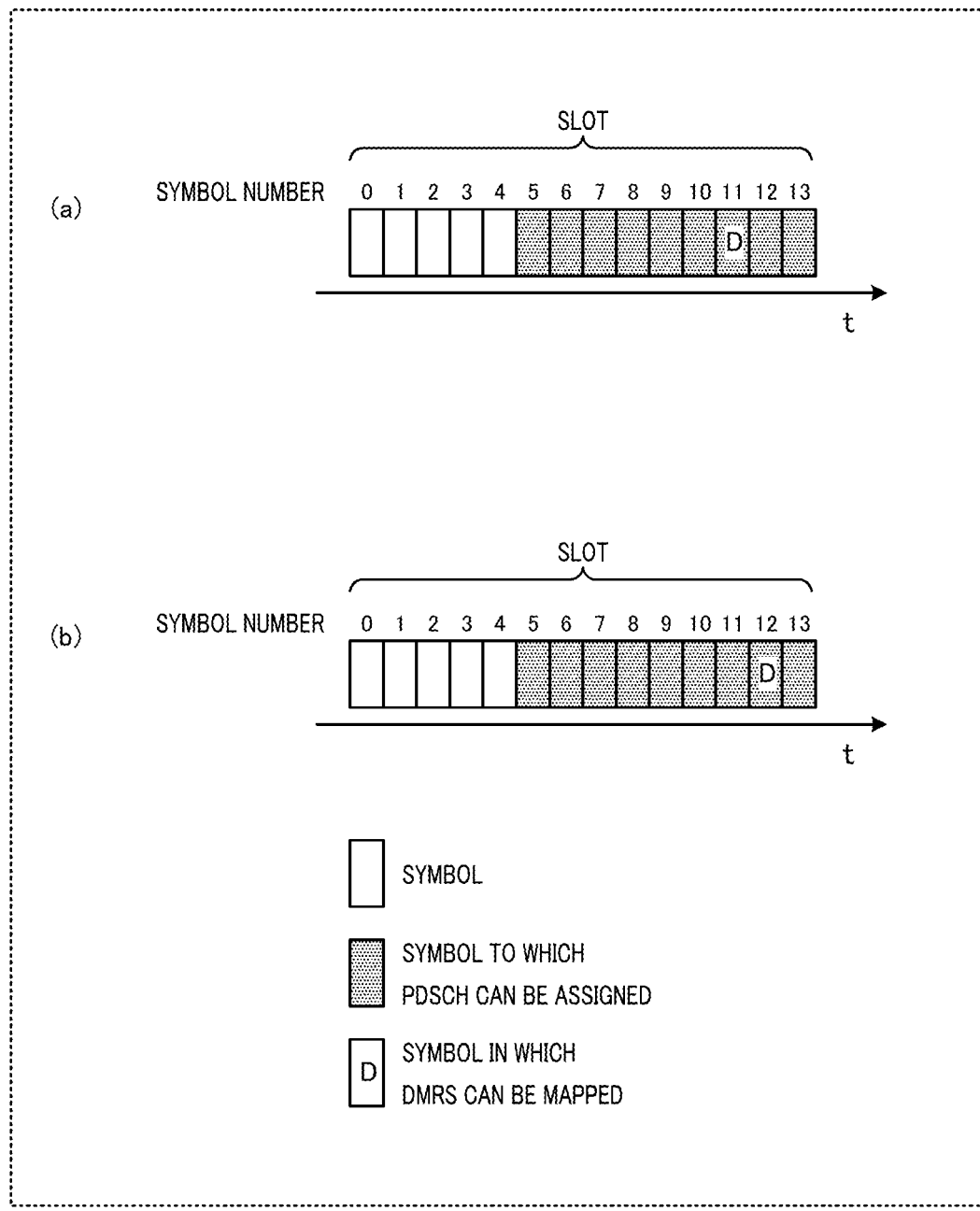
FIG. 10 illustrates exemplary signal mapping according to Operation Example 1-1.

As an example, a case in which an NR PDSCH for mobile station 200 is assigned to 9 symbols from the fifth symbol through the thirteenth symbol in the slot as illustrated in FIG. 10(*a*) will be described. In this case, for example, based on "Assumption 1" illustrated in FIG. 2, the position of a DMRS in the PDSCH is configured for the eleventh symbol corresponding to l=6 as illustrated in FIG. 10(*a*).

Further, in FIG. 3, for example, a CRS can be mapped in the eleventh symbol in the slot, but cannot be mapped in the twelfth symbol. Accordingly, it is possible to suppress a collision between the DMRS in the NR PDSCH and an LTE CRS by configuring (in other words, changing or shifting)

the position of the DMRS for (to) the twelfth symbol different from the eleventh symbol, for example.

For example, in a case where contents indicated in configuration information of mobile station 200 satisfy at least one of the following conditions, base station 100 and mobile station 200 decide that the position of the DMRS is the twelfth symbol different from the eleventh symbol configured for mobile station 200 as illustrated in FIG. 10(*b*) (for example, the processing in ST103 and ST107 illustrated in FIG. 9). In other words, in the processing in ST103 and ST107 illustrated in FIG. 9, base station 100 and mobile station 200 may determine that the condition for shifting the DMRS is "true" in a case where contents indicated in information configured for mobile station 200 (for example, information that allows mapping of an LTE CRS to be identified (or to be estimated)) satisfy the following conditions.

Condition (1): "Mobile Station 200 is Not Operated in Unlicensed Band (also referred to as 'NR-Unlicensed (NR-U), for example)'"

For example, base station 100 may indicate mobile station 200 of a frequency band of NR (for example, a licensed band or an unlicensed band) configured for mobile station 200 by control information (for example, a higher-layer signal or DCI), or the frequency band may be configured for mobile station 200.

For example, it can be assumed that the DSS is not operated in an unlicensed band. Accordingly, in a case where mobile station 200 is operated in an unlicensed band, the DMRS included in the NR signal for mobile station 200 cannot collide with an LTE CRS so that the position of the DMRS in the NR PDSCH (for example, the eleventh symbol) may not be changed.

In a licensed band, on the other hand, the DSS can be operated so that a CRS may be mapped in the eleventh symbol in the slot as illustrated in FIG. 3, for example. Accordingly, in a case where mobile station 200 is not operated in an unlicensed band, it can be identified that an LTE CRS and the DMRS can overlap with each other.

Thus, for example, in a case where Condition (1) is satisfied, base station 100 and mobile station 200 may decide that the position of the DMRS is the twelfth symbol different from the eleventh symbol. In other words, in a case where mobile station 200 is operated in a licensed band, base station 100 and mobile station 200 may decide that the position of the DMRS is the twelfth symbol.

Condition (2): "RRC Parameter RateMatchPatternLTE-CRS is Configured for Mobile Station 200"

For example, in a case where the RateMatchPatternLTE-CRS is configured for mobile station 200, an LTE CRS may have been configured in the LTE-system so that the DMRS in the NR PDSCH and the LTE CRS may overlap with each other. For example, since a CRS can be mapped in the eleventh symbol in the slot as illustrated in FIG. 3, it can be identified that the DMRS in the NR PDSCH and the LTE CRS can overlap with each other in the eleventh symbol.

Accordingly, in a case where Condition (2) is satisfied, base station 100 and mobile station 200 may decide that the position of the DMRS is the twelfth symbol different from the eleventh symbol.

Condition (3): "RRC Parameter RateMatchPatternLTE-CRS is Configured for Mobile Station 200, and Timing of MBSFN Subframe Configured by the RRC Parameter Does Not Coincide with DMRS Transmission Timing"

For example, as illustrated in FIG. 3, a CRS can be mapped in the zeroth or first symbol in an MBSFN subframe. Accordingly, in a case where the timing of an MBSFN subframe coincides with DMRS transmission timing, the DMRS in the PDSCH and an LTE CRS cannot collide with each other so that the position of the DMRS in the NR PDSCH (for example, the eleventh symbol) may not be changed.

On the other hand, in a case where the timing of an MBSFN subframe does not coincide with DMRS transmission timing, for example, in a case where the timing of a non-MBSFN subframe coincides with DMRS transmission timing, a CRS can be mapped in the eleventh symbol as illustrated in FIG. 3 so that it can be identified that the DMRS in the PDSCH and an LTE CRS can collide with each other.

Accordingly, in a case where Condition (3) is satisfied, base station 100 and mobile station 200 may decide that the position of the DMRS is the twelfth symbol different from the eleventh symbol.

As described above, in an MBSFN subframe, a DMRS is not mapped in the eleventh symbol. Accordingly, Condition (3) represents a condition in which the DMRS and a CRS are more likely to collide with each other than in Condition (2).

Condition (4): "Active BWP including Sub Carrier Spacing (SCS) of 15 KHz is Used in Mobile Station 200"

In a case where the SCS configured for mobile station 200 in the NR system is 15 kHz, that is, in the case of the same sub carrier spacing as in the LTE system, it can be identified that the DMRS in the NR PDSCH and an LTE CRS can collide with each other in the eleventh symbol as illustrated in FIG. 3, for example.

Accordingly, in a case where Condition (4) is satisfied, base station 100 and mobile station 200 may decide that the position of the DMRS is the twelfth symbol different from the eleventh symbol.

Condition (5): "Orthogonal DMRS Port Based MU-MIMO is Operated for Mobile Station 200"

When the position of the DMRS is changed in at least one mobile station 200 of a plurality of mobile stations 200 to be subjected to MU-MIMO multiplexing in a case where mobile station 200 is indicated of the orthogonal DMRS port based MU-MIMO by DCI, for example, the DMRS orthogonality among the plurality of mobile stations 200 may deteriorate.

Accordingly, in a case where Condition (5) is satisfied, base station 100 and mobile station 200 may decide that the position of the DMRS is the twelfth symbol different from the eleventh symbol.

In other words, in a case where Condition (5) is satisfied, the position of the DMRS for the plurality of mobile stations 200 for which the orthogonal DMRS port based MU-MIMO is operated is configured for the twelfth symbol. With this DMRS configuration, even in a case where the position of the DMRS with respect to mobile station 200 for which the DSS operation is performed is changed, for example, the position of the DMRS with respect to other mobile stations 200 to be subjected to MU-MIMO multiplexing together is also changed so that deterioration of the DMRS orthogonality among the plurality of mobile stations 200 can be suppressed.

For example, in a case where mobile station B is indicated in the example illustrated in FIG. 4 that the orthogonal DMRS port based MU-MIMO is operated, mobile station B may decide, even in a case where the DSS is not operated for mobile station B, that the position of the DMRS is the twelfth symbol considering that the DSS can be operated for another mobile station A to be subjected to MU-MIMO multiplexing.

Note that, Condition (5) may be defined as "It is Implied that DCI Received by Mobile Station 200 is Orthogonal DMRS Port Based MU-MIMO", for example.

Condition (6): "Assignment by PDSCH Mapping Type B is Indicated by DCI Received by Mobile Station 200"

In assignment by the PDSCH mapping type B, in $l_d=9$ as illustrated in FIG. 2, for example, the DMRS in the PDSCH can be mapped in the eleventh symbol corresponding to l=6. Further, as illustrated in FIG. 3, for example, a CRS can be mapped in the eleventh symbol in the slot. Accordingly, in a case where the PDSCH mapping type B is configured, the DMRS in the NR PDSCH and an LTE CRS can collide with each other in the eleventh symbol.

Accordingly, in a case where Condition (6) is satisfied, base station 100 and mobile station 200 may decide that the position of the DMRS is the twelfth symbol different from the eleventh symbol.

Condition (7): "Assignment by PDSCH Mapping Type B is Indicated by DCI Received by Mobile Station 200 and the Assignment is '9 Symbols from the Fifth Symbol through the Thirteenth Symbol'"

In the assignment by the PDSCH mapping type B as described in Condition (6), the DMRS in the PDSCH can be mapped in the eleventh symbol corresponding to l=6 in a case where the length of the PDSCH is 9 symbols (for example, $l_d=9$ illustrated in FIG. 2). Further, a CRS can be mapped in the eleventh symbol in the slot as illustrated in FIG. 3, for example. Accordingly, in a case where the PDSCH mapping type B is configured, the DMRS in the NR PDSCH and an LTE CRS can collide with each other in the eleventh symbol.

Accordingly, in a case where Condition (7) is satisfied, base station 100 and mobile station 200 may decide that the position of the DMRS is the twelfth symbol different from the eleventh symbol.

For example, in a case where the length of the PDSCH is 10 symbols (for example, $l_d=10$ illustrated in FIG. 2) for single-symbol DMRS as illustrated in FIG. 2, a DMRS is not mapped in the eleventh symbol (corresponding to l=7). Accordingly, Condition (7) represents a condition in which the DMRS and a CRS are more likely to collide with each other than in Condition (6).

Conditions (1) to (7) have been described thus far, respectively.

Base station 100 and mobile station 200 may determine to decide that the position of the DMRS is the eleventh symbol or the twelfth symbol, based on any one or a plurality of Conditions (1) to (7), for example.

According to Operation Example 1-1, for example, in a case where the DMRS in the NR PDSCH and an LTE CRS can collide with each other, base station 100 and mobile station 200 decide that the position of the DMRS is (in other words, change or shift the position of the DMRS to) the twelfth symbol in which the DMRS does not collide with the CRS, based on information configured for mobile station 200. This decision of the DMRS position makes it possible to avoid a collision between the DMRS in the NR PDSCH and the LTE CRS.

Further, for example, in a case where at least one of Conditions (1) to (7) described above is satisfied, base station 100 and mobile station 200 may determine that the orthogonal DMRS based MU-MIMO can be operated for mobile station 200.

For example, base station 100 performs the DMRS shift for each of a plurality of mobile stations 200 for which the orthogonal DMRS based MU-MIMO is operated. Further, each mobile station 200 for which the orthogonal DMRS based MU-MIMO is operated determines, on the assumption that the DMRS shift can be performed for avoiding a collision between the DMRS and a CRS in another mobile station 200 to be subjected to MU-MIMO multiplexing is performed, that the DMRS shift is also performed for each mobile station 200 described above. In a case where the orthogonal DMRS based MU-MIMO is operated for each mobile station 200 described above, the above determination makes it possible to reduce deterioration of the orthogonality among DMRS ports corresponding to the plurality of mobile stations 200, respectively.

Given the above, Operation Example 1-1 makes it possible to avoid a collision between a DMRS and a CRS, for example. Further, Operation Example 1-1 makes it possible to maintain the orthogonality among DMRS ports, for example.

Note that, although the case of m=11 and n=12 has been described in Operation Example 1-1, the position of the DMRS after a change (in other words, after a shift) is not limited to the twelfth symbol, but may be the thirteenth symbol or a symbol thereafter or may be the tenth symbol, or the ninth symbol or a symbol prior thereto, for example. Changes to these symbols enable a DMRS to be flexibly mapped at a temporal position or spacing suitable for enhancing channel estimation accuracy in mobile station 200, for example.

Operation Example 1-2

In Operation Example 1-2, for example, a method will be described in which base station 100 and mobile station 200 determine whether the position of a DMRS configured for the eighth symbol (for example, m=8) in the NR slot is changed (in other words, shifted) to the ninth symbol (for example, n=9).

Figure 11:
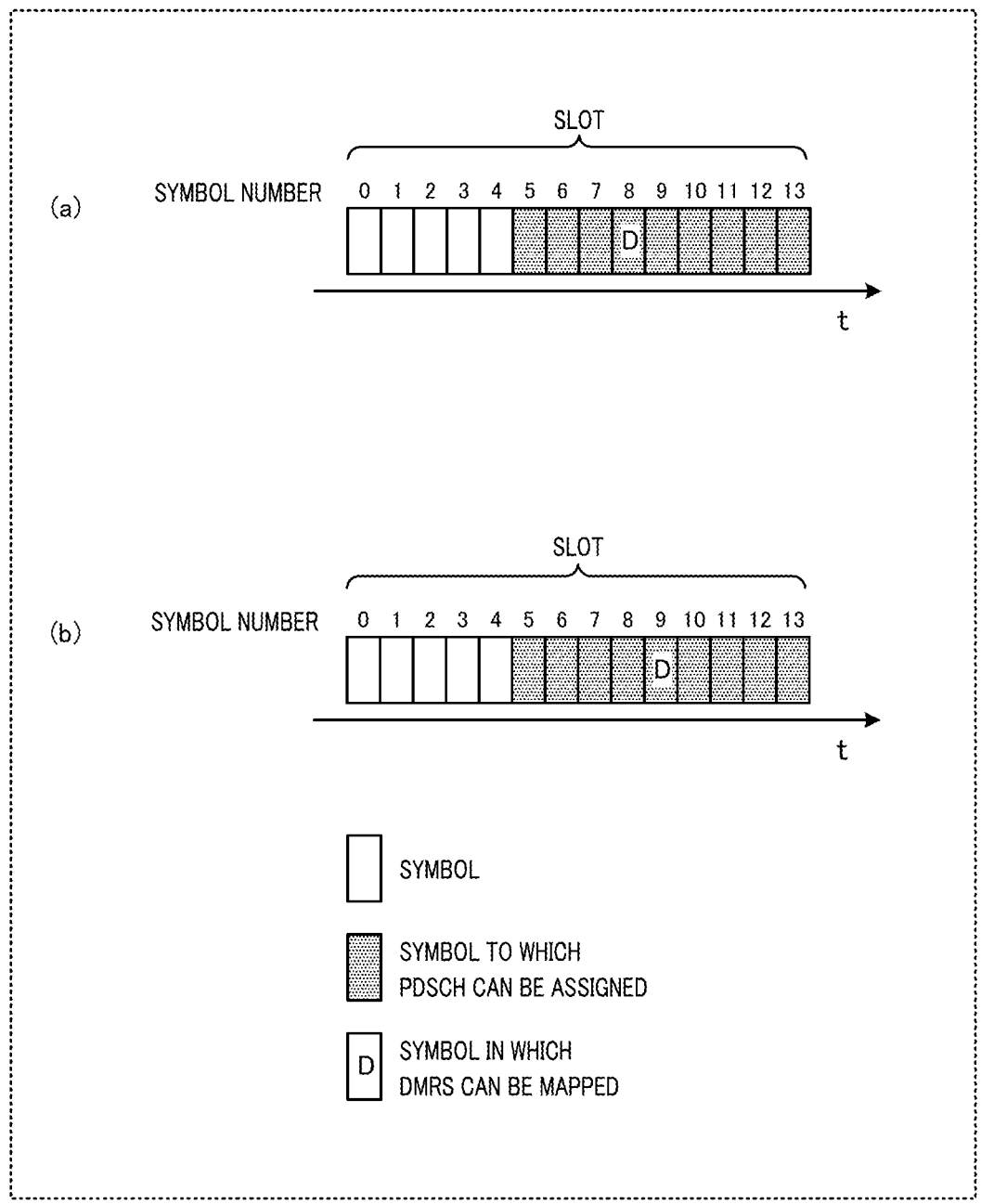
FIG. 11 illustrates exemplary signal mapping according to Operation Example 1-2.

As an example, a case in which an NR PDSCH for mobile station 200 is assigned to 9 symbols from the fifth symbol through the thirteenth symbol in the slot as illustrated in FIG. 11(*a*) will be described. In this case, based on "Assumption 1" illustrated in FIG. 2, for example, the position of a DMRS in the PDSCH is configured for the eighth symbol corresponding to l=3 as illustrated in FIG. 11(*a*).

Further, in FIG. 3, for example, a CRS can be mapped in the eighth symbol in the slot, but cannot be mapped in the ninth symbol. Accordingly, it is possible to suppress a collision between the DMRS in the NR PDSCH and an LTE CRS by configuring (in other words, changing or shifting) the position of the DMRS for (to) the ninth symbol different from the eighth symbol, for example.

In Operation Example 1-2, in a case where contents indicated in configuration information of mobile station 200 satisfy at least one of Conditions (1) to (7) described in Operation Example 1-1 and Condition (8) described below, for example, base station 100 and mobile station 200 decide that the position of the DMRS is the ninth symbol different from the eighth symbol configured for mobile station 200 as illustrated in FIG. 11(*b*) (for example, the processing in ST103 and ST107 illustrated in FIG. 9).

Condition (8):

Condition (8) is a case where "RRC Parameter RateMatchPatternLTE-CRS is Configured for Mobile Station 200, Number of CRS Ports Configured by the RRC Parameter is 4, and Timing of MBSFN Subframe Configured by the RRC Parameter Does Not Coincide with DMRS Transmission Timing".

An example in which Condition (8) is satisfied is a case where the timing of a non-MBSFN subframe coincides with DMRS transmission timing. For example, as illustrated in FIG. 3, a CRS can be mapped in the eighth symbol in a non-MBSFN subframe with the number of CRS ports of 4 so that the DMRS in the NR PDSCH and an LTE CRS can overlap with each other in the eighth symbol.

Accordingly, in a case where Condition (8) is satisfied, base station 100 and mobile station 200 may decide that the position of the DMRS is the ninth symbol different from the eighth symbol.

Base station 100 and mobile station 200 may determine to decide that the position of the DMRS is the eighth symbol or the ninth symbol, based on any one or a plurality of Conditions (1) to (8), for example.

According to Operation Example 1-2, for example, in a case where the DMRS in the NR PDSCH and an LTE CRS can collide with each other, base station 100 and mobile station 200 decide that the position of the DMRS in the NR PDSCH is (in other words, change or shift the position of the DMRS in the NR PDSCH to) the ninth symbol in which the DMRS does not collide with the CRS, based on information configured for mobile station 200. This decision of the DMRS position makes it possible to avoid a collision between the DMRS in the NR PDSCH and the LTE CRS.

Further, for example, in a case where at least one of Conditions (1) to (8) described above is satisfied, base station 100 and mobile station 200 may determine that the orthogonal DMRS based MU-MIMO can be operated for mobile station 200.

For example, base station 100 performs the DMRS shift for each of a plurality of mobile stations 200 for which the orthogonal DMRS based MU-MIMO is operated. Further, each mobile station 200 for which the orthogonal DMRS based MU-MIMO is operated determines, on the assumption that the DMRS shift can be performed for avoiding a collision between the DMRS and a CRS in another mobile station 200 to be subjected to MU-MIMO multiplexing, that the DMRS shift is also performed for each mobile station 200 described above. In a case where the orthogonal DMRS based MU-MIMO is operated for each mobile station 200 described above, the above determination makes it possible to reduce deterioration of the orthogonality among DMRS ports corresponding to the plurality of mobile stations 200, respectively.

Given the above, Operation Example 1-2 makes it possible to avoid a collision between a DMRS and a CRS, for example. Further, Operation Example 1-2 makes it possible to maintain the orthogonality among DMRS ports, for example.

Note that, although the case of m=8 and n=9 has been described in Operation Example 1-2, the position of the DMRS after a change (in other words, after a shift) is not limited to the ninth symbol, but may be the tenth symbol, the eleventh symbol or a symbol thereafter, or may be the seventh symbol, or the sixth symbol or a symbol prior thereto, for example. Changes to these symbols enable a DMRS to be flexibly mapped at a temporal position or spacing suitable for enhancing channel estimation accuracy in mobile station 200, for example.

Operation Example 1-3

In Operation Example 1-3, for example, a method will be described in which base station 100 and mobile station 200 determine whether the position of a DMRS (in other words, a double-symbol DMRS) configured for the tenth and eleventh symbols (for example, m=10 and 11) in the NR slot is changed (in other words, shifted) to the twelfth and thirteenth symbols (for example, n=12 and 13).

Figure 12:
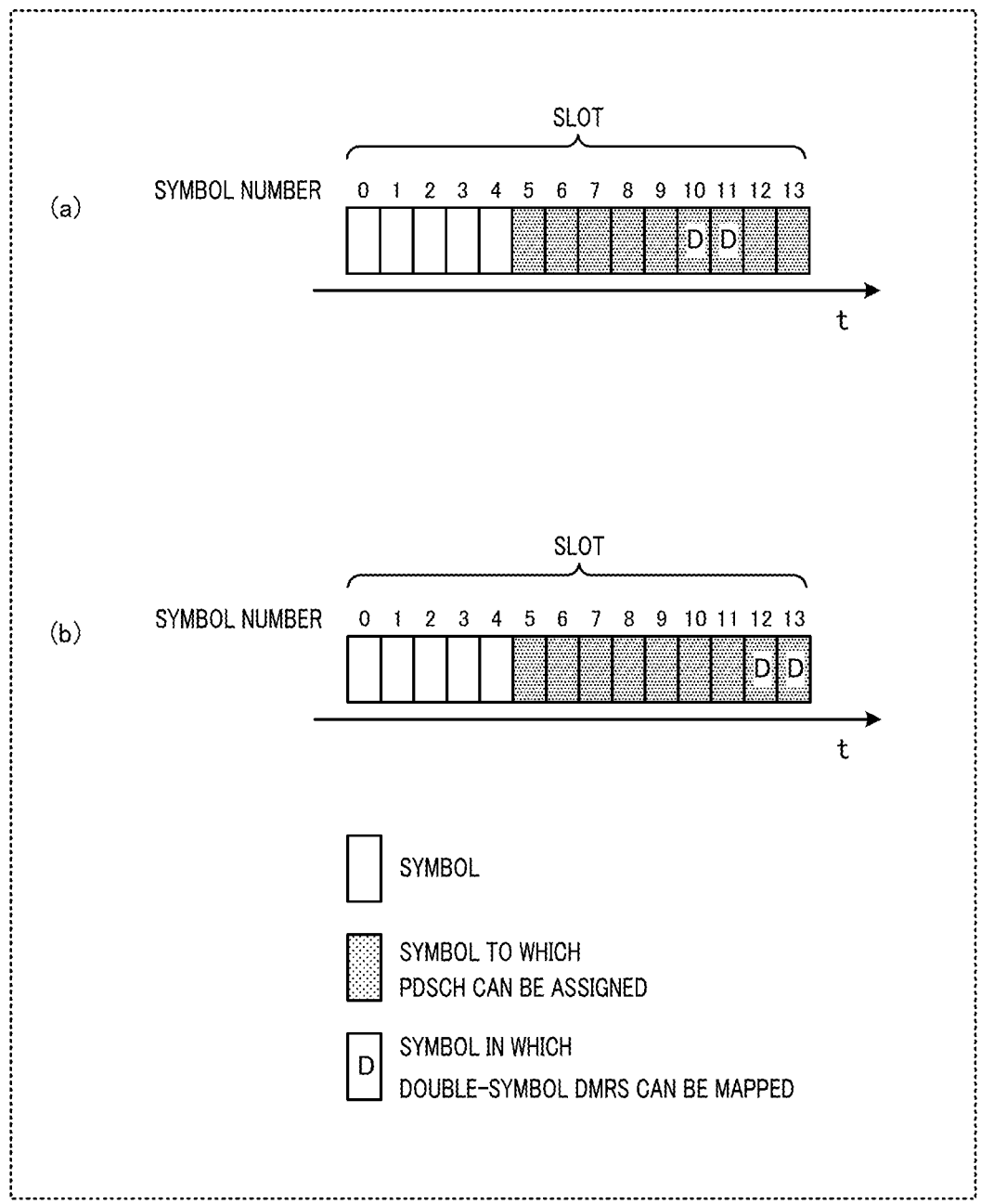
FIG. 12 illustrates exemplary signal mapping according to Operation Example 1-3.

As an example, a case in which an NR PDSCH for mobile station 200 is assigned to 9 symbols from the fifth symbol through the thirteenth symbol in the slot as illustrated in FIG. 12(a) will be described. In this case, based on "Assumption 1" illustrated in FIG. 2, for example, the position of a DMRS in the PDSCH is configured for the tenth and eleventh symbols corresponding to l=5 as illustrated in FIG. 12(a).

Further, in FIG. 3, for example, a CRS can be mapped in the eighth symbol in the slot, but cannot be mapped in the ninth symbol. Accordingly, it is possible to suppress a collision between the DMRS in the NR PDSCH and an LTE CRS by configuring (in other words, changing or shifting) the position of the DMRS for (to) the ninth symbol different from the eighth symbol, for example.

In Operation Example 1-3, in a case where contents indicated in configuration information of mobile station 200 satisfy at least one of Conditions (1) to (7) described in Operation Example 1-1, for example, base station 100 and mobile station 200 decide that the position of the DMRS is the twelfth and thirteenth symbols different from the tenth and eleventh symbols configured for mobile station 200 as illustrated in FIG. 12(b) (for example, the processing in ST103 and ST107 illustrated in FIG. 9).

Base station 100 and mobile station 200 may determine to decide that the position of the DMRS is the tenth and eleventh symbols or the twelfth and thirteenth symbols, based on any one or a plurality of Conditions (1) to (7), for example.

According to Operation Example 1-3, for example, in a case where the DMRS in the NR PDSCH and an LTE CRS can collide with each other, base station 100 and mobile station 200 decide that the position of the double-symbol DMRS in the NR PDSCH is (in other words, change or shift the position of the double-symbol DMRS in the NR PDSCH to) the twelfth and thirteenth symbols in which the double-symbol DMRS does not collide with the CRS, based on information configured for mobile station 200. This decision of the DMRS position makes it possible to avoid a collision between the double-symbol DMRS in the NR PDSCH and the LTE CRS.

Further, for example, in a case where at least one of Conditions (1) to (7) described above is satisfied, base station 100 and mobile station 200 may determine that the orthogonal DMRS based MU-MIMO can be operated for mobile station 200 in the same manner as in Operation Example 1-1.

For example, base station 100 performs the DMRS shift for each of a plurality of mobile stations 200 for which the orthogonal DMRS based MU-MIMO is operated. Further, each mobile station 200 for which the orthogonal DMRS based MU-MIMO is operated determines, on the assumption that the DMRS shift can be performed for avoiding a collision between the DMRS and a CRS in another mobile station 200 to be subjected to MU-MIMO multiplexing, that the DMRS shift is also performed for each mobile station 200 described above. In a case where the orthogonal DMRS based MU-MIMO is operated for each mobile station 200 described above, the above determination makes it possible to reduce deterioration of the orthogonality among DMRS ports corresponding to the plurality of mobile stations 200, respectively.

Given the above, Operation Example 1-3 makes it possible to avoid a collision between a double-symbol DMRS and a CRS, for example. Further, Operation Example 1-3 makes it possible to maintain the orthogonality among DMRS ports, for example.

Note that, although the case of m=10 and 11 and n=12 and 13 has been described in Operation Example 1-3, the position of the DMRS after a change (in other words, after a shift) is not limited to the twelfth and thirteenth symbols, but may be, for example, the ninth and tenth symbols, or 2 symbols among the ninth symbol and symbols prior thereto. Changes to these symbols enable a DMRS to be flexibly mapped at a temporal position or spacing suitable for enhancing channel estimation accuracy in mobile station 200, for example.

Operation Example 1-4

In Operation Example 1-4, for example, a method will be described in which base station 100 and mobile station 200 determine whether the position of a DMRS configured for the eighth symbol (for example, m=8) in the NR slot is changed (in other words, shifted) to the tenth symbol (for example, n=10).

In Operation Example 1-4, for example, an active BWP with sub carrier spacing of 30 kHz may be configured for mobile station 200 (for example, the processing in ST101 illustrated in FIG. 9).

Figure 13:
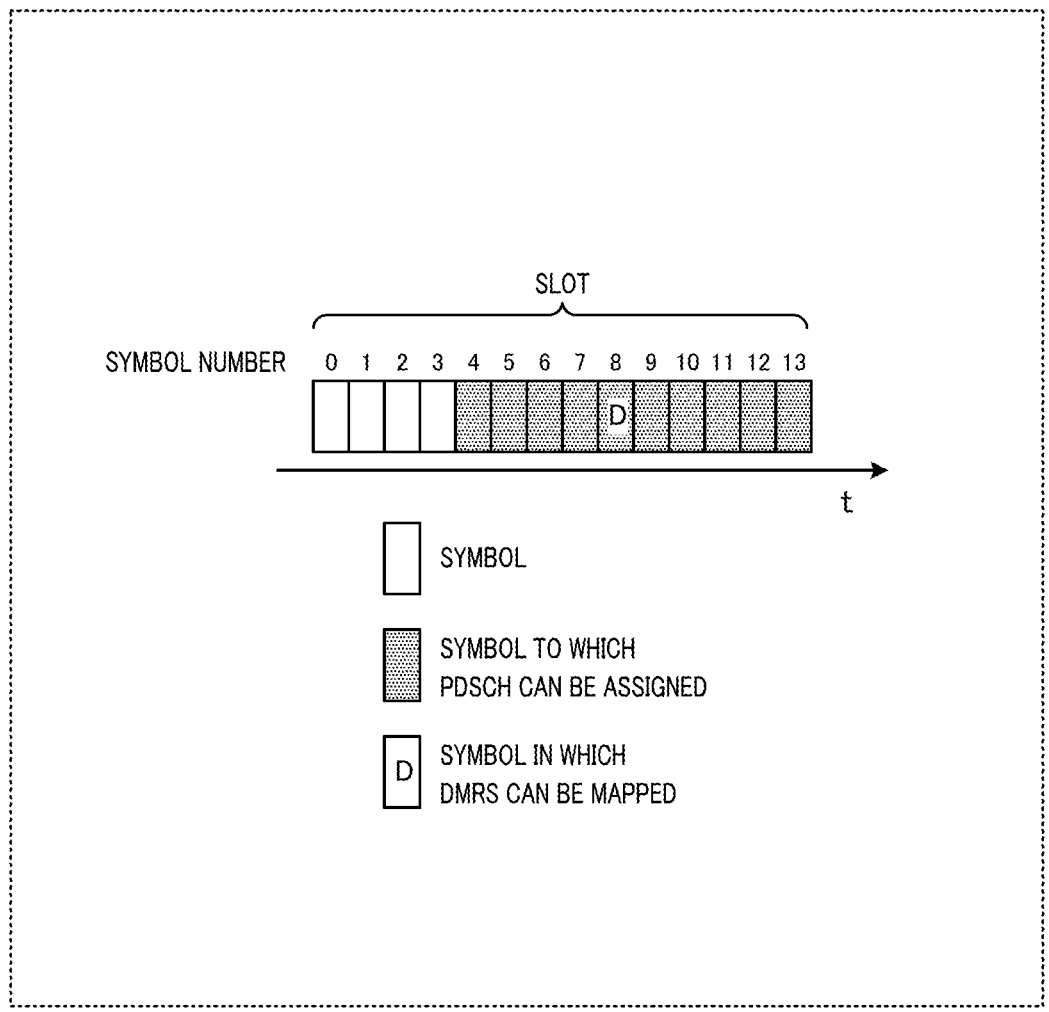
FIG. 13 illustrates exemplary signal mapping according to Operation Example 1-4.

Further, base station 100 may assign, for example, an NR PDSCH to 9 symbols from the fifth symbol through the thirteenth symbol in the slot as illustrated in FIG. 11(a) or to 10 symbols from the fourth symbol through the thirteenth symbol in the slot as illustrated in FIG. 13 for mobile station 200 (for example, the processing in ST102 illustrated in FIG. 9).

Further, for example, base station 100 may assign a PDSCH to an active BWP with sub carrier spacing of 30 kHz for mobile station 200 (for example, the processing in ST102 illustrated in FIG. 9).

Further, base station 100 may configure the operation of the orthogonal DMRS port based MU-MIMO for mobile station 200 (for example, the processing in ST102 illustrated in FIG. 9).

For example, based on "Assumption 1" illustrated in FIG. 2, the position of a DMRS in the PDSCH is configured for the eighth symbol corresponding to l=3 in $l_d$=9 or l=4 in $l_d$=10 as illustrated in FIGS. 11(a) and 13.

In a case where the SCS for NR is 30 kHz, the time corresponding to 1 symbol is half in comparison with the SCS=15 kHz in LTE. In other words, 1 symbol with SCS=15 kHz corresponds to 2 symbols with SCS=30 kHz.

For example, in FIG. 3, the fourth symbol (or the eleventh symbol) in which a CRS is mapped in LTE with SCS=15 kHz corresponds to 2 symbols of the eighth and ninth symbols in NR with SCS=30 kHz. Accordingly, for example, in the eighth and ninth symbols in the NR slot with SCS=30 kHz, a CRS can be mapped at a position corresponding to the fourth symbol (or the eleventh symbol) with SCS=15 kHz. In contrast, a CRS cannot be mapped in the tenth symbol in the NR slot with SCS=30 kHz (corresponding to the fifth symbol or the twelfth symbol with SCS=15 kHz, for example). Accordingly, it is possible to suppress a collision between the DMRS in the NR PDSCH and an LTE CRS by configuring (in other words, changing or shifting) the position of the DMRS in the NR slot with SCS=30 kHz for (to) the tenth symbol different from the eighth symbol, for example.

Figure 14:
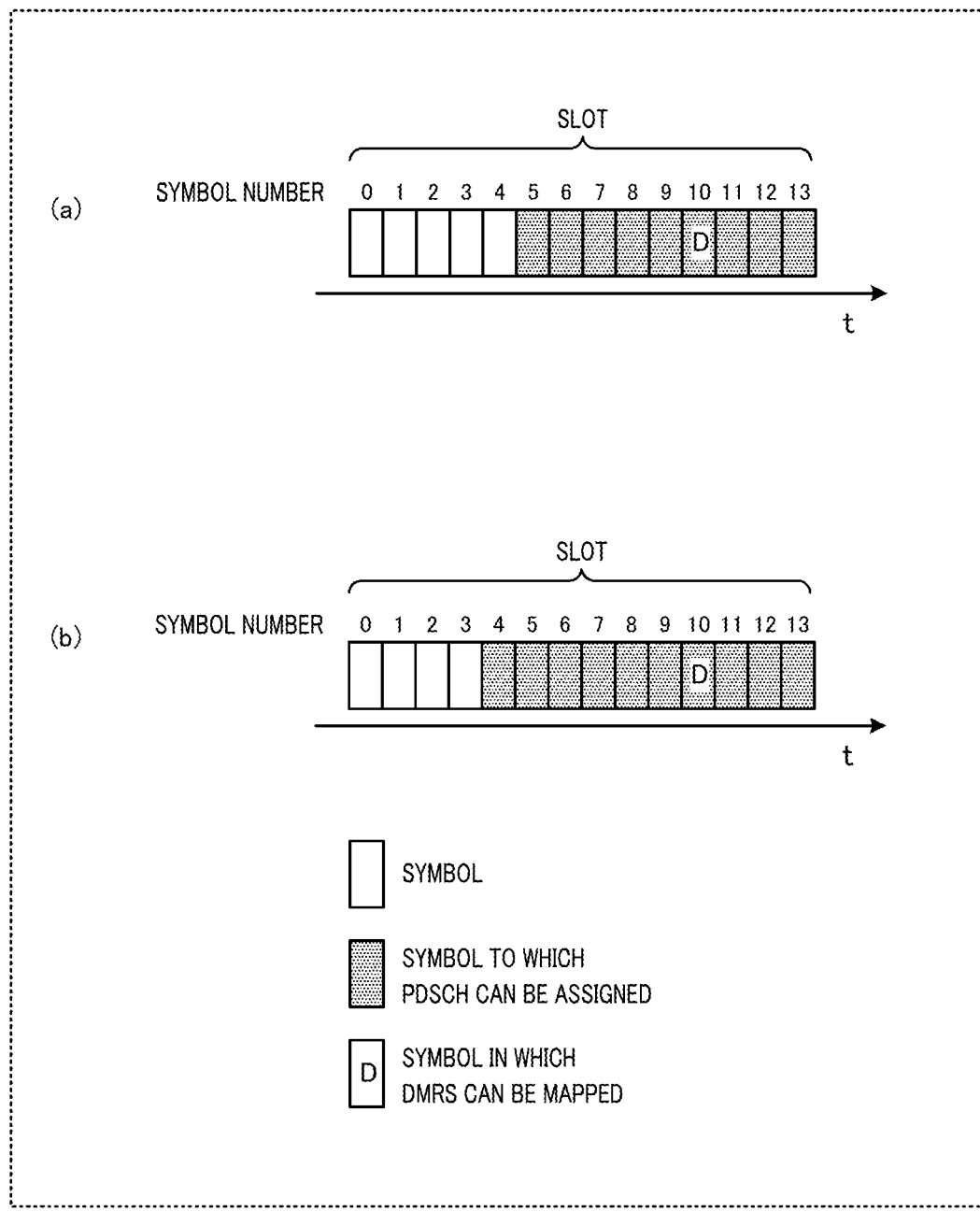
FIG. 14 illustrates exemplary signal mapping according to Operation Example 1-4.

In Operation Example 1-4, for example, in a case where contents indicated in configuration information of mobile station 200 satisfy at least one of Conditions (1) to (3), (5), and (6) described in Operation Example 1-1 and Conditions (4)' and (7)' described below, base station 100 and mobile station 200 decide that the position of the DMRS is the tenth symbol different from the eighth symbol as illustrated in FIGS. 14(a) and 14(b)(for example, the processing in ST103 and ST107 illustrated in FIG. 9).

Condition (4)': "Active BWP with Sub Carrier Spacing (SCS) of 30 KHz is Used in Mobile Station 200"

As described above, in a case where the SCS for NR is 30 kHz, the DMRS in the NR PDSCH and an LTE CRS can collide with each other in the eighth symbol in the NR slot.

Accordingly, in a case where Condition (4)' is satisfied, base station 100 and mobile station 200 may decide that the position of the DMRS is the tenth symbol different from the eighth symbol (for example, a symbol after one symbol with SCS=15 kHz).

Condition (7)': "Assignment by PDSCH Mapping Type B is Indicated by DCI Received by Mobile Station 200 and the Assignment is '9 Symbols from the Fifth Symbol through the Thirteenth Symbol' or '10 Symbols from the Fourth Symbol through the Thirteenth Symbol'"

As described above, in the assignment by the PDSCH mapping type B, a DMRS in a PDSCH can be mapped in the eighth symbol corresponding to l=3 in a case where the length of the PDSCH is 9 symbols (for example, $l_d$=9 illustrated in FIG. 2) and l=4 in a case where the length of the PDSCH is 10 symbols (for example, $l_d$=10 illustrated in FIG. 2), respectively. Further, as described above, a CRS can be mapped in the fourth symbol or the eleventh symbol in the slot with SCS=15 kHz, which corresponds to the eighth symbol with SCS=30 kHz. Accordingly, in a case where the PDSCH mapping type B is configured and the length of a PDSCH is 9 symbols and 10 symbols, the DMRS in the NR PDSCH and an LTE CRS can collide with each other in the eighth symbol in the NR slot.

Accordingly, in a case where Condition (7)' is satisfied, base station 100 and mobile station 200 may decide that the position of the DMRS is the tenth symbol different from the eighth symbol (for example, a symbol after one symbol with SCS=15 kHz).

Base station 100 and mobile station 200 may determine to decide that the position of the DMRS is the eighth symbol or the tenth symbol, based on any one or a plurality of Conditions (1) to (3), (4)', (5), (6) and (7)', for example.

According to Operation Example 1-4, for example, in a case where the DMRS in the NR PDSCH and an LTE CRS can collide with each other, base station 100 and mobile station 200 decide that the position of the DMRS in the NR PDSCH is (in other words, change or shift the position of the DMRS in the NR PDSCH to) the tenth symbol in which the DMRS does not collide with the CRS, based on information configured for mobile station 200. This decision of the DMRS position makes it possible to avoid a collision between the DMRS in the NR PDSCH and the LTE CRS even in a case where the SCS in NR differs from the SCS in LTE.

Further, for example, in a case where at least one of Conditions (1) to (3), (4)', (5), (6) and (7)' described above is satisfied, base station 100 and mobile station 200 may determine that the orthogonal DMRS based MU-MIMO can be operated for mobile station 200.

For example, base station 100 performs the DMRS shift for each of a plurality of mobile stations 200 for which the orthogonal DMRS based MU-MIMO is operated.

Further, each mobile station 200 for which the orthogonal DMRS based MU-MIMO is operated determines, on the assumption that the DMRS shift can be performed for avoiding a collision between the DMRS and a CRS in another mobile station 200 to be subjected to MU-MIMO multiplexing, that the DMRS shift is also performed for each mobile station 200 described above. In a case where the orthogonal DMRS based MU-MIMO is operated for each mobile station 200 described above, the above determination makes it possible to reduce deterioration of the orthogonality among DMRS ports corresponding to the plurality of mobile stations 200, respectively.

Given the above, Operation Example 1-4 makes it possible to avoid a collision between a DMRS and a CRS, for example. Further, Operation Example 1-4 makes it possible to maintain the orthogonality among DMRS ports, for example.

Note that, although the case of m=8 and n=10 has been described in Operation Example 1-4, the position of the DMRS after a change (in other words, after a shift) is not limited to the tenth symbol, but may be, for example, the eleventh symbol, or the twelfth symbol or a symbol thereafter, or may be the seventh symbol, or the sixth symbol or a symbol prior thereto. Changes to these symbols enable a DMRS to be flexibly mapped at a temporal position or spacing suitable for enhancing channel estimation accuracy in mobile station 200, for example.

As described above, in Operation Examples 1-1 to 1-4, the case where the position of a DMRS is decided based on the position of the DMRS and the position of a CRS, which can be configured for mobile station 200 in Rel. 16, has been described as examples. In other words, in Operation Examples 1-1 to 1-4, base station 100 and mobile station 200 are capable of identifying a symbol in which a DMRS and a CRS can collide with each other or a symbol in which a DMRS and a CRS cannot collide with each other, based on configuration information of mobile station 200, for example.

For example, the conditions described in Operation Examples 1-1 to 1-4 are independent of whether a symbol in which a CRS is mapped and a symbol configured for a DMRS for mobile station 200 overlap (in other words, collide) with other. Accordingly, in a case where the above-described conditions are satisfied in Operation Examples 1-1 to 1-4, base station 100 and mobile station 200 are capable of, for example, maintaining the orthogonality among DMRS ports corresponding to the plurality of mobile stations 200 subjected to MU-MIMO multiplexing, respectively, by changing mapping of the DMRS, even in a case where a CRS and the DMRS do not actually collide with each other.

Operation Example 1-5

In Operation Example 1-5, for example, an operation example in which base station 100 and mobile station 200 cannot identify whether there is a collision between a DMRS and a CRS based on configuration information of mobile station 200 will be described.

For example, in Operation Example 1-5, a description will be given of a method in which base station 100 and mobile station 200 determine whether the position of a DMRS configured for any symbol in the NR slot is changed (in other words, shifted) to a different symbol.

In Operation Example 1-5, for example, an active BWP with sub carrier spacing of 15 kHz, 30 kHz or 60 kHz may be configured for mobile station 200 (for example, the processing in ST101 illustrated in FIG. 9).

Further, for example, base station 100 may assign an NR PDSCH to a frequency band in which an LTE CRS can be transmitted and to any time resource in the slot for mobile station 200 (for example, the processing in ST102 illustrated in FIG. 9).

Further, for example, base station 100 may assign a PDSCH to an active BWP with sub carrier spacing of 15 kHz, 30 kHz or 60 kHz for mobile station 200 (for example, the processing in ST102 illustrated in FIG. 9).

Further, base station 100 may configure the operation of the orthogonal DMRS port based MU-MIMO for mobile station 200 (for example, the processing in ST102 illustrated in FIG. 9).

For example, the position of a DMRS in a PDSCH configured based on "Assumption 1" illustrated in FIG. 2 is referred to as "the x-th symbol".

Base station 100 determines, for example, whether the position of the DMRS is changed (in other words, shifted) to a symbol (hereinafter referred to as "the y-th symbol") different from the x-th symbol configured for mobile station 200 (for example, the processing in ST103 illustrated in FIG. 9). For example, in a case where a symbol in which a CRS is mapped and the x-th symbol configured for mobile station 200 overlap with each other, base station 100 may decide that the position of the DMRS is the y-th symbol different from the x-th symbol.

For example, base station 100 may determine, based on information on an LTE CRS (for example, information on CRS mapping) and information on resources configured for mobile station 200 (for example, information on allocation resources of a frequency domain and a time domain with respect to the PDSCH), whether a symbol in which the CRS is mapped and the x-th symbol in which the DMRS is mapped overlap with each other. In other words, base station 100 determines whether the CRS and the DMRS can collide with each other in the x-th symbol. For example, in a case where base station 100 has determined that the CRS and the DMRS can collide with other, base station 100 may determine that the condition for shifting the DMRS is "true".

In a case where the condition for shifting the DMRS is true (ST103: YES), base station 100 decides that the position of the DMRS is (in other words, changes or shifts the position of the DMRS to) the y-th symbol different from the x-th symbol (ST104). For example, in symbols after the x-th symbol, base station 100 may map the DMRS in (in other words, may shift the DMRS to) the y-th symbol having a smaller symbol number among symbols in which the DMRS does not collide with the CRS.

Note that, in a case where in symbols after the x-th symbol, there is no symbol in which the DMRS does not collide with the CRS, base station 100 may map the DMRS in the x-th symbol (in other words, does not shift the DMRS).

Further, mobile station 200 determines, for example, whether a change to a position (the y-th symbol) different from the position of a DMRS (the x-th symbol) configured based on a control signal indicated by base station 100 is performed (for example, the processing in ST107 illustrated in FIG. 9). For example, in a case where a symbol in which a CRS is mapped and the x-th symbol configured for mobile station 200 overlap with other, mobile station 200 may decide that the position of the DMRS is the y-th symbol different from the x-th symbol.

For example, in the same manner as in base station 100, mobile station 200 determines, based on information on an LTE CRS and assignment information on a PDSCH configured for mobile station 200, whether a symbol in which the CRS is mapped and the x-th symbol in which the DMRS is mapped can overlap (in other words, collide) with each other. For example, in a case where mobile station 200 has determined that the CRS and the DMRS can collide with each other, mobile station 200 may determine that the condition for shifting the DMRS is "true".

In a case where the condition for shifting the DMRS is true (ST107: YES), mobile station 200 determines that it has been decided that the position of the DMRS is (in other words, the position of the DMRS has been changed or shifted to) the y-th symbol different from the x-th symbol (ST108). For example, mobile station 200 may determine that in symbols after the x-th symbol, the DMRS has been mapped in (in other words, has been shifted to) the y-th symbol having a smaller symbol number among symbols in which the DMRS does not collide with the CRS.

Note that, in a case where in symbols after the x-th symbol, there is no symbol in which the DMRS does not collide with the CRS, base station 100 may determine that the DMRS has been mapped in the x-th symbol (in other words, may determine that the DMRS is not shifted).

According to Operating Example 1-5, for example, in a case where the DMRS in the NR PDSCH and an LTE CRS can collide with other, base station 100 and mobile station 200 decide that the position of the DMRS in the NR PDSCH is (in other words, change or shift the position of the DMRS in the NR PDSCH to) another symbol in which the DMRS does not collide with the CRS. This decision of the DMRS position makes it possible to avoid a collision between the DMRS in the NR PDSCH and the LTE CRS.

Note that, the sub carrier spacing configured for mobile station 200 is not limited to 15 kHz, 30 kHz and 60 kHz, but may be any other spacing.

Further, in Operation Example 1-5, in symbols after the x-th symbol, the y-th symbol is not limited to a symbol having the smallest number among symbols in which the DMRS does not collide with the CRS, but may be, among symbols in which the DMRS does not collide with the CRS, a symbol having the second smallest number or a symbol having the third smallest number and so forth, for example. Alternatively, the y-th symbol may be a symbol which is prior to the x-th symbol and in which the DMRS does not collide with the CRS. Changes to these symbols enable a DMRS to be flexibly mapped at a temporal position or spacing suitable for enhancing channel estimation accuracy in mobile station 200, for example.

Further, base station 100 and mobile station 200 may determine whether the position of a DMRS configured for mobile station 200 is changed based on whether contents indicated in configuration information of mobile station 200 satisfy at least one of Conditions (1), (3), (5) and (8) described above, for example, in addition to determination whether the DMRS and a CRS can collide with each other.

Further, for example, in a case where at least one of Conditions (1), (3), (5) and (8) described above is satisfied, base station 100 and mobile station 200 may determine that the orthogonal DMRS based MU-MIMO can be operated for mobile station 200. For example, base station 100 performs the DMRS shift for each of a plurality of mobile stations 200 for which the orthogonal DMRS based MU-MIMO is operated. Further, each mobile station 200 for which the orthogonal DMRS based MU-MIMO is operated determines, on the assumption that the DMRS shift can be performed for avoiding a collision between the DMRS and a CRS in another mobile station 200 to be subjected to MU-MIMO multiplexing, that the DMRS shift is also performed for each mobile station 200 described above. In a case where the orthogonal DMRS based MU-MIMO is operated for each mobile station 200 described above, the above determination makes it possible to reduce deterioration of the orthogonality among DMRS ports corresponding to the plurality of mobile stations 200, respectively.

The operation examples of DMRS mapping have been described thus far.

As described above, in the present embodiment, base station 100 and mobile station 200 decide mapping of a DMRS in an NR PDSCH based on information configured for mobile station 200 (in other words, information that allows mapping of an LTE CRS to be identified), for example. This decision of the DMRS mapping enables base station 100 operating the DSS to appropriately map the DMRS and makes it possible to avoid a collision between the DMRS and a CRS, for example. Further, this decision of the DMRS mapping makes it possible to maintain the orthogonality among DMRS ports, for example. Further, even in a case where the DSS is operated, mobile station 200 is capable of appropriately determining the DMRS mapping and receiving the NR PDSCH.

Variation 1 of Embodiment 1

In a case where DMRSs are mapped in a plurality of symbols in the slot in Embodiment 1, base station 100 and mobile station 200 may simultaneously change (in other words, shift) the plurality of symbols in which the DMRSs are mapped.

For example, in a case where the positions of DMRSs in "Assumption 1" illustrated in FIG. 2 are the eighth and eleventh symbols, base station 100 and mobile station 200 may change the positions of the DMRSs to the ninth symbol and the twelfth symbol, respectively.

This change in the DMRS mapping makes it possible to avoid collisions between the plurality of DMRSs and CRSs.

Variation 2 of Embodiment 1

In Embodiment 1, for example, information on the LTE system (for example, the RRC parameter RateMatchPatternLTE-CRS) of which mobile station 200 is indicated by base station 100 in the processing in ST101 illustrated in FIG. 9 may be information on a CRS in a component carrier (CC) of LTE operating in any one of the following bands:
(1) System band of an NR component carrier in which base station 100 and mobile station 200 operate;
(2) Any BWP configured for mobile station 200;
(3) Active BWP used for transmission to mobile station 200; and
(4) Band assigned to a PDSCH to be transmitted to mobile station 200.

Further, in a case where there is a plurality of LTE component carriers among the bands described above, base station 100 may indicate mobile station 200 of a parameter (s) indicating information on a CRS(s) in one or a plurality of the LTE component carriers.

For example, in a case where a plurality of parameters is indicated, base station 100 and mobile station 200 may determine based on one or a plurality of the parameters whether the position of a DMRS is changed (for example, the processing in ST103 and ST107 illustrated in FIG. 9).

Further, base station 100 and mobile station 200 may also determine based on one or some of a plurality of parameters whether the position of a DMRS is changed. For example, base station 100 and mobile station 200 may be operated based on a parameter including a larger number of CRS ports among a plurality of parameters or may be operated based on a parameter in which a non-MBSFN subframe is configured more frequently. With these operations, the position of a DMRS is decided in consideration of a circumstance under which CRSs can be mapped in more resources, for example, so that the possibility of a collision between a CRS and a DMRS can be reduced.

Further, base station 100 may also indicate mobile station 200 of a parameter based on which it is determined whether the position of a DMRS is changed.

Variation 3 of Embodiment 1

In Embodiment 1, the condition for determining whether the position of a DMRS is changed may be information known between base station 100 and mobile station 200 or may be information of which mobile station 200 is indicated by base station 100 by a control signal such as a higher-layer signal or DCI, for example.

Alternatively, mobile station 200 may be indicated by base station 100 of information indicating a result of determination whether the position of a DMRS is changed, by a control signal such as a higher-layer signal or DCI.

This indication allows mobile station 200 to accurately determine whether the position of a DMRS transmitted by base station 100 has been changed.

Variation 4 of Embodiment 1

In Embodiment 1, the operation of mobile station 200 by the orthogonal DMRS port based MU-MIMO may be implicitly indicated, for example, by DCI related to antenna port mapping which indicates that "all the remaining orthogonal antenna ports are not associated with transmission of PDSCH to another UE".

Variation 5 of Embodiment 1

Figure 15:
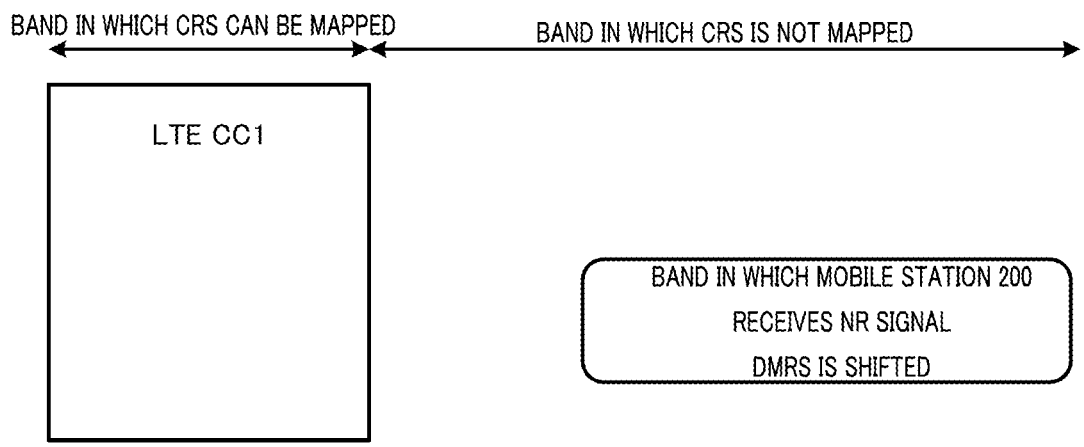
FIG. 15 illustrates an operation example in a case where the orthogonal DMRS based MU-MIMO is not operated.

In Embodiment 1, the position of a DMRS received by mobile station 200 for which the orthogonal DMRS based MU-MIMO is not operated may be shifted as in FIG. 15, which makes it possible to alleviate degradation of reception accuracy due to a collision of a DMRS between cells, for example.

Variation 6 of Embodiment 1

In Embodiment 1, the parameter included in the conditions of the respective operation examples described above is not limited to the RateMatchPatternLTE-CRS, but may be, for example, a parameter related to at least a CRS or a MBSFN subframe and included in a control signal, such as a higher-layer parameter or DCI, with a name different from that of the RateMatchPatternLTE-CRS, or the like.

Embodiment 2

For example, in a case where a plurality of DMRSs is mapped in a slot, a change in the position of a DMRS that can collide with a CRS as described in Embodiment 1 can change the positional relation (for example, time spacing) between the DMRS whose position has been changed and another DMRS (in other words, a DMRS whose position has not been changed).

For example, the larger the time spacing between DMRSs is, the more channel estimation accuracy between the DMRSs can degrade.

Further, for example, the smaller the time spacing between DMRSs, the less the effect of mapping DMRSs in a plurality of symbols can be. In other words, the smaller the time spacing between DMRSs, the more overhead due to the DMRS increases and the less resource utilization efficiency can be.

In the present embodiment, a DMRS mapping method which suppresses degradation of channel estimation accuracy, and a DMRS mapping method which enhances resource utilization efficiency will be described.

Note that, the base station and mobile station according to the present embodiment are common to base station 100 and mobile station 200 according to Embodiment 1 in terms of the basic configurations.

Next, operation examples of DMRS mapping according to the present embodiment will be described, respectively.

Operation Example 2-1

In Operation Example 2-1, for example, in a case where DMRSs are mapped in a plurality of symbols in the slot, base station 100 and mobile station 200 change (in other words, shift), in addition to the position of a DMRS that can collide with a CRS, the position of a DMRS that cannot collide with a CRS.

Figure 16:
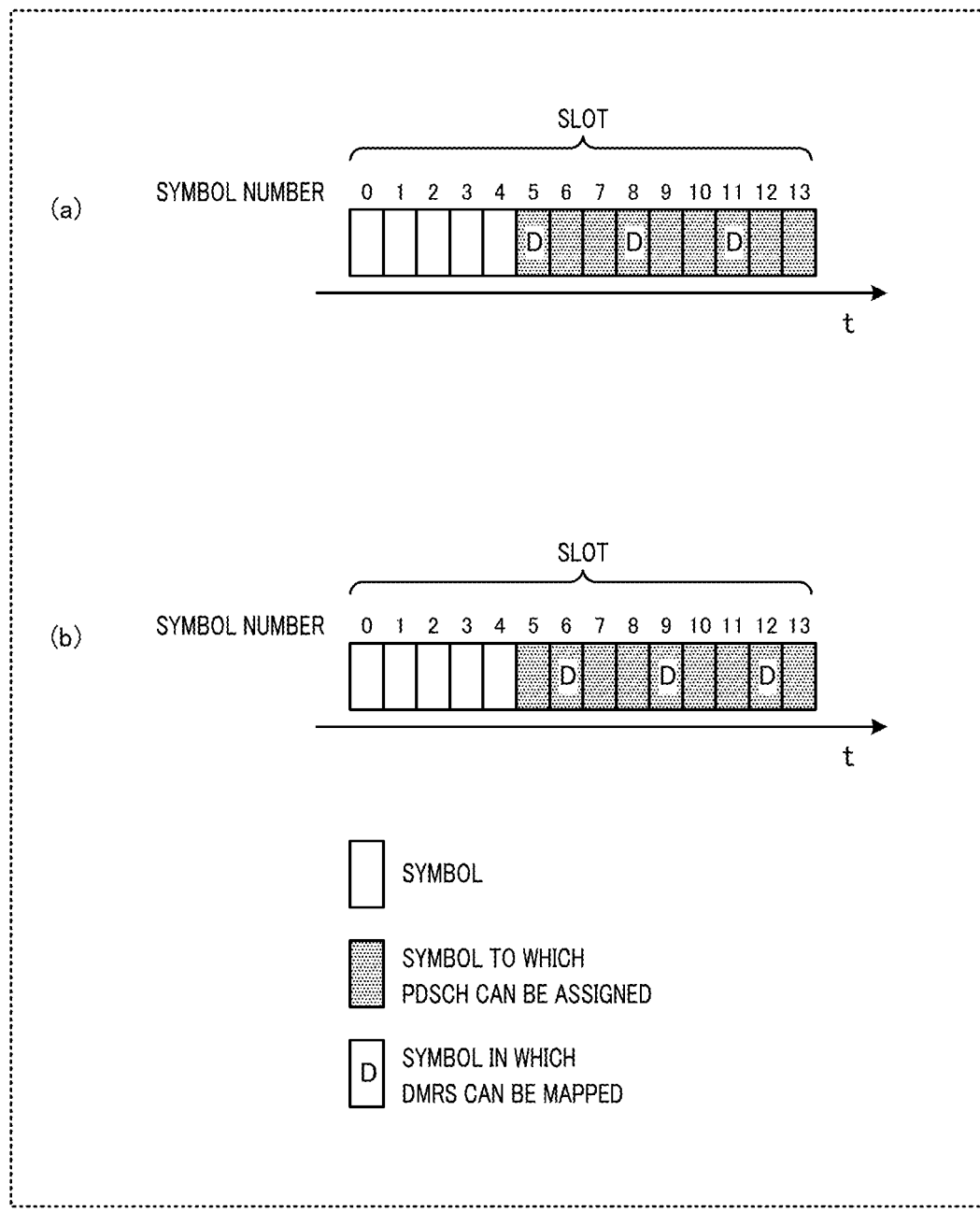
FIG. 16 illustrates exemplary signal mapping according to Operation Example 2-1.

As an example, a case in which an NR PDSCH is assigned to 9 symbols from the fifth symbol through the thirteenth symbol in a BWP with sub carrier spacing of 15 kHz for mobile station 200 as illustrated in FIG. 16(a) will be described.

In this case, for example, based on "Assumption 1" illustrated in FIG. 2, the positions of DMRSs in the PDSCH are configured for the fifth, eighth and eleventh symbols (l=0, 3, 6).

Further, for example, base station 100 and mobile station 200 determine that CRSs can be mapped in at least the seventh, eighth, and eleventh symbols in the slot as illustrated in FIG. 3.

In this case, base station 100 and mobile station 200 determine that a DMRS and a CRS can collide with each other in the eighth and eleventh symbols, for example.

Accordingly, base station 100 may change (in other words, shift) the positions of the DMRSs, which can be mapped in the eighth and eleventh symbols, and the position of the DMRS, which can be mapped in the fifth symbol, for example. For example, base station 100 may change the DMRSs in the fifth, eighth, and eleventh symbols illustrated in FIG. 16(a) to be in the sixth, ninth, and twelfth signals, respectively, as illustrated in FIG. 16(b).

Further, in the same manner as in base station 100, mobile station 200 may determine that the DMRS of the fifth, eighth, and eleventh symbols illustrated in FIG. 16(a) are mapped in the sixth, ninth, and twelfth symbols, respectively, as illustrated in FIG. 16(b).

In Operation Example 2-1, for example, in a case where at least one DMRS position is changed in a plurality of DMRSs in the slot, base station 100 and mobile station 200 change the positions of the remaining DMRSs based on the DMRS position (in other words, the change in the position). For example, as illustrated in FIGS. 16(a) and 16(b), three DMRSs in the PDSCH are shifted one symbol rearward, respectively, from the positions configured for mobile station 200 (for example, the positions based on "Assumption 1"). In other words, as illustrated in FIG. 16(b), the mapping spacing between the DMRSs after the change (for example, 3 symbols) is not different from the mapping spacing between the DMRSs before the change (for example, 3 symbols).

Since this DMRS mapping does not change the mapping spacing in a time domain among a plurality of DMRSs even in a case where the positions of the DMRSs are changed, degradation of channel estimation accuracy due to the DMRSs can be suppressed.

Operation Example 2-2

In Operation Example 2-2, for example, in a case where DMRSs are mapped in a plurality of symbols in the slot, base station 100 and mobile station 200 decide not to transmit (in other words, drop) one DMRS of two DMRSs with time spacing equal to or less than a threshold value in the decided mapping of the DMRSs (in other words, the positions thereof after the change).

Figure 17:
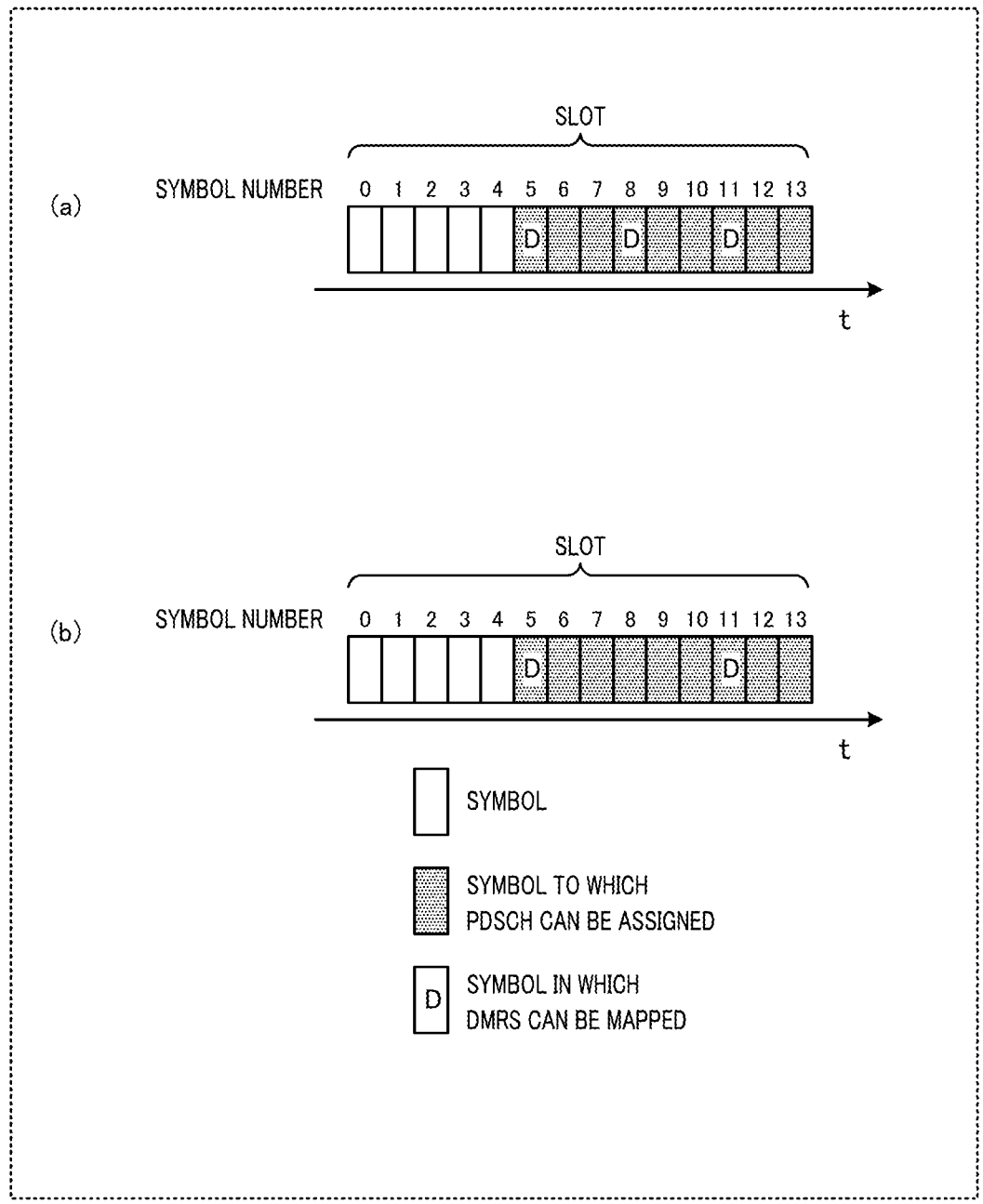
FIG. 17 illustrates exemplary signal mapping according to Operation Example 2-2.

As an example, a case in which an NR PDSCH is assigned to 9 symbols from the fifth symbol through the thirteenth symbol in a BWP with sub carrier spacing of 30 kHz for mobile station 200 as illustrated in FIG. 17(*a*) will be described.

Here, the threshold value related to the time spacing between DMRSs for determining whether a DMRS is dropped is 1 symbol. Note that, the threshold value is not limited to 1 symbol, but may be 2 or more symbols.

In this case, for example, based on "Assumption 1" illustrated in FIG. 2, the positions of the DMRSs in the PDSCH are configured for the fifth, eighth, and eleventh symbols (l=0, 3, 6).

Further, for example, base station 100 and mobile station 200 determine that a LTE CRS (for example, with SCS of 15 kHz) can be mapped in at least the eighth symbol in the slot. In this case, base station 100 and mobile station 200 determine that a DMRS and a CRS can collide with each other in the eighth symbol, for example.

Accordingly, base station 100 and mobile station 200 decide that the position of the DMRS is (in other words, change or shift the position of the DMRS to) the tenth symbol different from the eighth symbol, for example. In this case, the decided mapping of the DMRSs is the fifth, tenth, and eleventh symbols.

Here, since the spacing between DMRSs that can be mapped in the tenth and eleventh symbols is equal to or less than the threshold value (1 symbol), base station 100 and mobile station 200 may decide to drop the DMRS that can be mapped in the tenth symbol as illustrated in FIG. 17(*b*), for example.

Accordingly, as illustrated in FIG. 17(*b*), base station 100 may transmit the DMRSs in the fifth and eleventh symbols, and mobile station 200 may receive the DMRSs in the fifth and eleventh symbols.

Further, for example, base station 100 may transmit another signal (for example, a PDSCH) in the tenth symbol from which the DMRS is dropped as illustrated in FIG. 17(*b*).

For example, in a case where a DMRS is mapped in the eleventh symbol as illustrated in FIG. 17(*b*), channel estimation accuracy is comparable to that when DMRSs are mapped in the tenth and eleventh symbols. In Operation Example 2-2, the DMRS is dropped from the tenth symbol as illustrated in FIG. 17(*b*), for example, so that degradation of channel estimation accuracy and an increase in overhead due to the DMRSs can be suppressed. Further, since another signal is mapped in the tenth symbol from which the DMRS is dropped, it is possible to enhance resource utilization efficiency.

Note that, although the case where the DMRS in the tenth symbol between the DMRSs which can be mapped in the tenth and eleventh symbols with spacing equal to or less than the threshold value is dropped has been described in FIG. 17(*b*), the DMRS to be dropped may be the DMRS in the eleventh symbol.

Each embodiment of the present disclosure has been described thus far.

Other Embodiments

In each embodiment described above, downlink communication in which the base station is a transmitting apparatus and the mobile station is a receiving apparatus is assumed. However, an embodiment of the present disclosure is not limited thereto and may be applied to uplink communication in which the mobile station is a transmitting apparatus and the base station is a receiving apparatus or to communication between mobile stations, that is, sidelink communication.

Further, in each embodiment described above, the case where the number of configuration symbols in the slot is 14 symbols has been described. However, the number of configuration symbols in the slot is not limited to 14 symbols, but may be any other number of symbols (for example, 12 symbols).

Further, in each embodiment described above, the case where the position (for example, a symbol) of a DMRS is changed (in other words, shifted) has been described. However, the signal whose position is changed is not limited to a DMRS, but may be any other signal. Further, in each embodiment described above, the case in which a collision between a DMRS and a CRS is avoided by the decision of the DMRS position has been described. However, the signal whose collision with a DMRS is taken into consideration is not limited to a CRS, but may be any other signal different from a CRS. For example, an embodiment of the present disclosure may be applied to, instead of at least one of a DMRS and a CRS, reference signals, channels, or other signals in NR or LTE as described below:

Phase Tracking Reference Signal (PT-RS, PTRS);
Channel State Information Reference Signal (CSI-RS);
Sounding Reference Signal (SRS);
Tracking Reference Signal (TRS);
Discovery Reference Signal (Discovery Signal, DRS);
Primary Synchronization Signal (PSS);
Secondary Synchronization Signal (SSS);
Physical Downlink Control Channel (PDCCH);
Physical Downlink Shared Channel (PDSCH);
Physical Uplink Control Channel (PUCCH);
Physical Uplink Shared Channel (PUSCH);
Physical Broadcast Channel (PBCH);
Physical Control Format Indicator Channel (PCFICH);
Physical HARQ Indicator Channel (PHICH); and
Physical Multicast Channel (PMCH).

Further, in each embodiment described above, the PDSCH mapping method is not limited to the PDSCH mapping type B. The PDSCH mapping method may be, for example, PDSCH mapping type A or any other mapping method. An embodiment of the present disclosure can be applied to a case where a DMRS and a CRS can collide with each other without depending on the PDSCH mapping method, for example.

Further, in each embodiment described above, when the position of a DMRS is changed (in other words, shifted), the position thereof may be changed to another frequency position. For example, a DMRS belonging to a certain DMRS CDM group maybe changed to a frequency position corresponding to another DMRS CDM group. Thus, a collision thereof with a CRS can be avoided more flexibly.

Further, in each embodiment described above, the "higher-layer signal" may also be referred to as "RRC signaling" or "MAC signaling", for example.

Further, in each embodiment described above, the "reference signal" may also be referred to as "standard signal" or "pilot signal", for example. Further, the DMRS may also be referred to as "DM-RS".

Further, in each embodiment described above, the unit of a time resource is not limited to the slot and the symbol, but may be any other time resource unit such as a frame, a subframe, or a subslot, for example.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a field programmable gate array (FPGA) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include a radio frequency (RF) module including amplifiers, RF modulators/demodulators and the like, and one or more antennas. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

A receiving apparatus according to an embodiment of the present disclosure includes: control circuitry, which, in operation, decides mapping of a second reference signal based on information that allows mapping of a first reference signal to be identified; and receiving circuitry, which, in operation, receives the second reference signal based on the decided mapping.

In an embodiment of the present disclosure, in a case where contents indicated in the information satisfy a certain condition, the control circuitry decides that a position of the second reference signal is a symbol different from a symbol configured for the receiving apparatus.

In an embodiment of the present disclosure, the condition is independent of whether a symbol in which the first reference signal is mapped and the symbol configured for the second reference signal for the receiving apparatus overlap with each other.

In an embodiment of the present disclosure, in a case where a first symbol in which the first reference signal is mapped and a second symbol configured for the second reference signal for the receiving apparatus overlap with each other, the control circuitry decides that a position of the second reference signal is a third symbol different from the second symbol, based on the information.

In an embodiment of the present disclosure, the control circuitry determines whether the first symbol and the second symbol overlap with each other, based on assignment information of data including the second reference signal and information on the mapping of the first reference signal.

In an embodiment of the present disclosure, in a case where contents indicated in the information satisfy a certain condition, the control circuitry decides that the position of the second reference signal is the third symbol.

In an embodiment of the present disclosure, the condition is independent of whether the first symbol and the second symbol overlap with each other.

In an embodiment of the present disclosure, in a case where a position of at least one reference signal of a plurality of the second reference signals is changed, the control circuitry changes a position of a remaining reference signal based on the position of the at least one reference signal.

In an embodiment of the present disclosure, the control circuitry decides not to transmit any one of two of a plurality of the second reference signals, the two of the plurality of second reference signals being signals with time spacing equal to or less than a threshold value in the decided mapping.

A transmitting apparatus according to an embodiment of the present disclosure includes: control circuitry, which, in operation, decides mapping of a second reference signal based on information that allows mapping of a first reference signal to be identified; and transmitting circuitry, which, in operation, transmits the second reference signal with the decided mapping.

A receiving method according to an embodiment of the present disclosure includes: deciding, by a receiving apparatus, mapping of a second reference signal based on information that allows mapping of a first reference signal to be identified; and receiving, by the receiving apparatus, the second reference signal based on the decided mapping.

A transmitting method according to an embodiment of the present disclosure includes: deciding, by a transmitting apparatus, mapping of a second reference signal based on information that allows mapping of a first reference signal to be identified; and transmitting, by the transmitting apparatus, the second reference signal with the decided mapping.

The disclosure of Japanese Patent Application No. 2019-149144, filed on Aug. 15, 2019, including the specification, drawings and abstract, is incorporated herein by reference in its entirety.

INDUSTRIAL APPLICABILITY

An embodiment of the present disclosure is useful for a mobile communication system.

REFERENCE SIGNS LIST

100 Base station
101, 206 Controller
102 Encoder/modulator
103 Signal mapper
104 Transmitter
105, 201 Antenna
200 Mobile station
202 Receiver
203 Signal separator
204 Channel estimator
205 Demodulator/decoder

The invention claimed is:

1. A receiving apparatus, comprising:
control circuitry, which, in operation, determines a mapping of a second reference signal, in a Physical Downlink Shared Channel (PDSCH) scheduled by PDSCH mapping type B, in a second system based on information that allows a mapping of a first reference signal in a first system to be identified; and
receiving circuitry, which, in operation, receives the second reference signal based on the determined mapping,
wherein in a case a duration of the PDSCH scheduled by the PDSCH mapping type B is a specific value, a subcarrier spacing is a specific value, and at least one symbol of the second reference signal collides with a symbol of the first reference signal, a position of the at least one symbol of the second reference signal and a remaining symbol of the second reference signal are shifted one symbol rearward.

2. The receiving apparatus according to claim 1, wherein in a case where contents indicated in the information satisfy a certain condition, the control circuitry determines that a position of the second reference signal is a symbol different from a symbol configured for the receiving apparatus.

3. The receiving apparatus according to claim 2, wherein the condition is independent of whether a symbol in which the first reference signal is mapped and the symbol configured for the second reference signal for the receiving apparatus overlap with each other.

4. The receiving apparatus according to claim 1, wherein in a case where a first symbol in which the first reference signal is mapped and a second symbol configured for the second reference signal for the receiving apparatus overlap with each other, the control circuitry determines that a position of the second reference signal is a third symbol different from the second symbol.

5. The receiving apparatus according to claim 4, wherein the control circuitry determines whether the first symbol and the second symbol overlap with each other, based on assignment information of data including the second reference signal and information on the mapping of the first reference signal.

6. The receiving apparatus according to claim 4, wherein in a case where contents indicated in the information satisfy a certain condition, the control circuitry determines that the position of the second reference signal is the third symbol.

7. The receiving apparatus according to claim 6, wherein the condition is independent of whether the first symbol and the second symbol overlap with each other.

8. The receiving apparatus according to claim 1, wherein a plurality of second reference signals include the second reference signal, and in a case where a position of at least one reference signal of the plurality of second reference signals is changed, the control circuitry changes a position of a remaining reference signal.

9. The receiving apparatus according to claim 1, wherein a plurality of second reference signals include the second reference signal, and the control circuitry determines that any one of two of the plurality of second reference signals are not transmitted, the two of the plurality of second reference signals being signals with time spacing equal to or less than a threshold value in the determined mapping.

10. A receiving method, comprising:
determining, by a receiving apparatus, a mapping of a second reference signal, in a Physical Downlink Shared Channel (PDSCH) scheduled by PDSCH mapping type B, in a second system based on information that allows a mapping of a first reference signal in a first system to be identified; and
receiving, by the receiving apparatus, the second reference signal based on the determined mapping,
wherein in a case a duration of the PDSCH scheduled by the PDSCH mapping type B is a specific value, a subcarrier spacing is a specific value, and at least one symbol of the second reference signal collides with a symbol of the first reference signal, a position of the at least one symbol of the second reference signal and a remaining symbol of the second reference signal are shifted one symbol rearward.

11. The receiving apparatus according to claim 4, wherein in a case where the subcarrier spacing configured for the receiving apparatus is a specific value, the control circuitry determines that a position of the second reference signal is a symbol different from a symbol configured for the receiving apparatus.

12. The receiving apparatus according to claim 4, wherein in a case where the subcarrier spacing configured for the receiving apparatus is 15 kHz, the control circuitry determines that a position of the second reference signal is a symbol different from a symbol configured for the receiving apparatus.

13. The receiving apparatus according to claim 4, wherein in a case where the duration of PDSCH is the specific value, the control circuitry determines that a position of the second reference signal is a symbol different from a symbol configured for the receiving apparatus.

* * * * *